(12) United States Patent
Shubat

(10) Patent No.: US 10,489,746 B2
(45) Date of Patent: Nov. 26, 2019

(54) CLOUD BASED PLATFORM FOR VEHICLE RELATED SERVICES

(71) Applicant: Espresa, Inc., Los Altos, CA (US)

(72) Inventor: Alex Shubat, Los Altos, CA (US)

(73) Assignee: Espresa, Inc., Los Altos, CA (US)

( * ) Notice: Subject to any disclaimer, the term of this patent is extended or adjusted under 35 U.S.C. 154(b) by 543 days.

(21) Appl. No.: 15/223,432

(22) Filed: Jul. 29, 2016

(65) Prior Publication Data
US 2017/0053246 A1    Feb. 23, 2017

Related U.S. Application Data

(60) Provisional application No. 62/199,146, filed on Jul. 30, 2015, provisional application No. 62/265,852, filed on Dec. 10, 2015.

(51) Int. Cl.
*G06Q 10/06* (2012.01)
*G06Q 10/10* (2012.01)
(Continued)

(52) U.S. Cl.
CPC ....... *G06Q 10/1057* (2013.01); *G06K 7/1417* (2013.01); *G06K 19/06037* (2013.01); (Continued)

(58) Field of Classification Search
CPC ........ G06Q 10/08; G06Q 10/20; G06Q 10/06; G06Q 20/3829; G06Q 30/0637;
(Continued)

(56) References Cited

U.S. PATENT DOCUMENTS 6,748,318 B1 * 6/2004 Jones .................... G06Q 10/08
340/992
8,874,755 B1    10/2014 Deklich et al.
(Continued)

FOREIGN PATENT DOCUMENTS

WO    2014039919    3/2014

OTHER PUBLICATIONS https://remotemechanic.com/vehicle-services/ (Year: 2015).*
(Continued)

*Primary Examiner* — Nathan A Mitchell
*Assistant Examiner* — Dana Amsdell
(74) *Attorney, Agent, or Firm* — Kilpatrick Townsend & Stockton LLP

(57) ABSTRACT

A method for managing vendor services provided at an employer service location includes receiving information pertaining to a vehicle related item or service, wherein the information pertains to a key associated with an employee vehicle pertaining to the vehicle related item or service. The method also includes scheduling a time for the vendor to provide the vehicle related item or service at an employer location based at least in part on availability of an employee and availability of the vendor. The method also includes transmitting a first notification to a device associated with the employee based at least in part on a first scanning of the asset. The method also includes transmitting a second notification to the device associated with the employee based at least in part on a second scanning of the asset.

20 Claims, 28 Drawing Sheets

(51) Int. Cl.
*G06Q 20/10* (2012.01)
*G06Q 20/32* (2012.01)
*H04W 4/021* (2018.01)
*G06K 7/14* (2006.01)
*G06K 19/06* (2006.01)
*G06Q 50/30* (2012.01)
*H04W 12/06* (2009.01)

(52) U.S. Cl.
CPC ... *G06Q 10/06313* (2013.01); *G06Q 10/1095* (2013.01); *G06Q 10/1097* (2013.01); *G06Q 20/102* (2013.01); *G06Q 20/3224* (2013.01); *H04W 4/021* (2013.01); *H04W 12/06* (2013.01)

(58) Field of Classification Search
CPC ............ G07C 2209/04; G07C 9/00309; G07C 9/00571; G07C 9/00007; G07C 9/00896; G07C 9/00103; G07C 9/00111; G07C 2009/00936; G07C 2205/02; G07C 5/008; B60S 5/06; B67D 2007/0442; B67D 2007/0459; B67D 7/0401; B67D 7/348; E05B 19/0005; G01C 21/206; B60R 25/24; B60R 25/241; G08G 1/123
See application file for complete search history.

(56) References Cited

U.S. PATENT DOCUMENTS

| | | | |
|---|---|---|---|
| 8,938,427 B2 * | 1/2015 | Ghani | G06Q 30/02 707/640 |
| 8,965,957 B2 | 2/2015 | Barros | |
| 9,426,225 B2 | 8/2016 | Penilla et al. | |
| 9,652,908 B2 * | 5/2017 | Fokkelman | H04W 76/14 |
| 9,984,520 B1 | 5/2018 | Heller et al. | |
| 2002/0027164 A1 | 3/2002 | Mault | |
| 2002/0089434 A1 * | 7/2002 | Ghazarian | G06Q 10/08 340/988 |
| 2002/0121962 A1 * | 9/2002 | Wolfe | G07C 9/00142 340/5.72 |
| 2003/0146854 A1 * | 8/2003 | Jones | G06Q 10/08 340/988 |
| 2003/0195696 A1 * | 10/2003 | Jones | G06Q 10/08 701/517 |
| 2005/0125238 A1 | 6/2005 | Jansen | |
| 2009/0049057 A1 * | 2/2009 | Ghani | G06Q 20/204 |
| 2009/0150306 A1 * | 6/2009 | Campbell | B60R 25/00 705/500 |
| 2011/0161227 A1 * | 6/2011 | Santo, Jr. | G06Q 10/10 705/40 |
| 2011/0265147 A1 | 10/2011 | Liu | |
| 2012/0066010 A1 * | 3/2012 | Williams | G06Q 10/0633 705/4 |
| 2012/0072985 A1 | 3/2012 | Davne et al. | |
| 2012/0233668 A1 | 9/2012 | Leafe et al. | |
| 2012/0267430 A1 | 10/2012 | Penny et al. | |
| 2012/0280790 A1 | 11/2012 | Gerhardt et al. | |
| 2013/0048710 A1 | 2/2013 | Marsico et al. | |
| 2013/0059598 A1 | 3/2013 | Miyagi et al. | |
| 2013/0151317 A1 | 6/2013 | Charfi et al. | |
| 2013/0257589 A1 | 10/2013 | Mohiuddin et al. | |
| 2013/0317693 A1 * | 11/2013 | Jefferies | G07B 15/00 701/31.5 |
| 2014/0006241 A1 | 1/2014 | Robb et al. | |
| 2014/0025512 A1 | 1/2014 | Armstrong et al. | |
| 2014/0075032 A1 | 3/2014 | Vasudevan et al. | |
| 2014/0075034 A1 | 3/2014 | Vasudevan et al. | |
| 2014/0075239 A1 | 3/2014 | Prathipati et al. | |
| 2014/0108474 A1 | 4/2014 | David et al. | |
| 2014/0151446 A1 | 6/2014 | Bovell | |
| 2014/0266585 A1 * | 9/2014 | Chao | G07C 9/00111 340/5.61 |
| 2014/0330685 A1 | 11/2014 | Nazzari | |
| 2015/0039409 A1 | 2/2015 | Marsico et al. | |
| 2015/0058467 A1 | 2/2015 | Douglas et al. | |
| 2015/0066782 A1 * | 3/2015 | Vainberg | G06Q 10/20 705/305 |
| 2015/0088779 A1 | 3/2015 | Falcone | |
| 2015/0089068 A1 | 3/2015 | Islam et al. | |
| 2015/0120440 A1 | 4/2015 | Jung et al. | |
| 2015/0120473 A1 | 4/2015 | Jung et al. | |
| 2015/0120500 A1 | 4/2015 | Jung et al. | |
| 2015/0170164 A1 * | 6/2015 | Marsico | G06Q 30/0201 235/375 |
| 2015/0310679 A1 * | 10/2015 | Fokkelman | H04W 76/14 340/5.61 |
| 2015/0332531 A1 * | 11/2015 | Davidsson | G07C 9/00182 70/256 |
| 2015/0363724 A1 | 12/2015 | Chatterjee et al. | |
| 2016/0092962 A1 * | 3/2016 | Wasserman | G06Q 30/0631 705/26.7 |
| 2016/0318481 A1 * | 11/2016 | Penilla | B60R 25/2018 |
| 2016/0364679 A1 * | 12/2016 | Cao | G06Q 10/083 |
| 2017/0046894 A1 * | 2/2017 | Robinson | G07C 9/00134 |
| 2018/0075567 A1 * | 3/2018 | Mycroft | G06Q 50/30 |
| 2018/0285832 A1 * | 10/2018 | Oz | H04W 4/44 |

OTHER PUBLICATIONS https://web.archive.org/web/20140117062203/http://www.movinlubin.com/Services.html (Year: 2014).*

U.S. Appl. No. 15/223,428, "Non Final Office Action", dated Sep. 6, 2018, 28 pages.

U.S. Appl. No. 15/223,428, "Final Office Action", dated May 15, 2019, 63 pages.

U.S. Appl. No. 15/223,421, "Non-Final Office Action", dated Apr. 4, 2019, 25 pages.

* cited by examiner

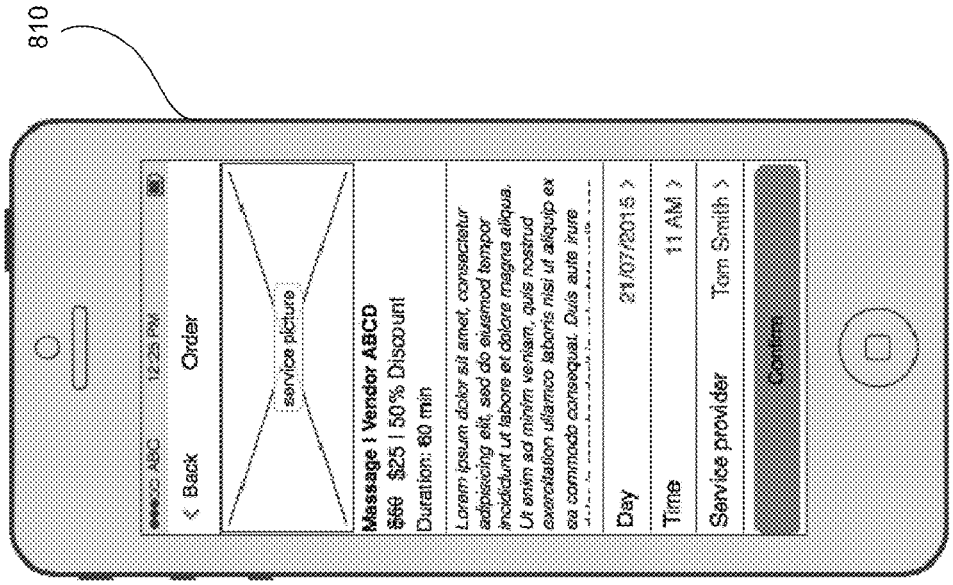
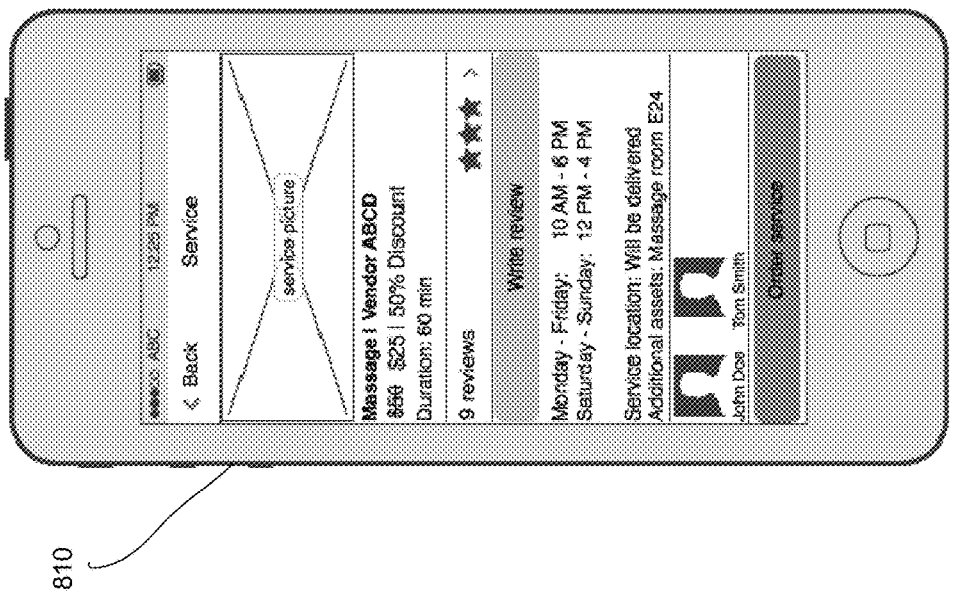
FIG. 8G
FIG. 8F

CLOUD BASED PLATFORM FOR VEHICLE RELATED SERVICES

CROSS-REFERENCE TO RELATED APPLICATIONS

This application claims the benefit of U.S. Provisional Application No. 62/199,146, filed Jul. 30, 2015, entitled "CLOUD BASED PLATFORM FOR WORKPLACE SERVICES MANAGEMENT" which is incorporated herein by reference, and U.S. Provisional Application No. 62/265,852, filed Dec. 10, 2015, entitled "CLOUD BASED PLATFORM FOR WORKPLACE PACKAGE DELIVERY" which is incorporated herein by reference.

BACKGROUND

In the workplace, concierge benefits and other on-site curated service are designed to balance an employee's personal and work life by offering timesaving benefits for employees. Typical workplace services include dry cleaning, meal catering, childcare arrangements, automobile services (oil changes, car wash, etc.), event tickets, and any other tasks employees do not have time to do or do not want to do. Employers benefit from increased employee productivity by reducing the amount of time employees may be spending on non-work-related activities during the day. Additionally, the workplace now becomes more increasingly attractive to potential and existing employees—improving recruiting and retention.

Typically, employers contract with a vendor who specializes in these workplace services or hire their own company concierge to coordinate the services in the same manner as a hotel does for its guests. Yet, the benefit to employees from increased employee productivity can be quickly diminished by the arduous process of vetting reputable vendors. Moreover, the employer now has additional issues with security and control by allowing on-side vendors access to facilities and employees.

Finally, the employer may cover the cost of some workplace services while employees are responsible for the actual expenses for the service (e.g., dry cleaning). An employer may choose to reimburse or provide vouchers for the services themselves, however, this can be cumbersome to track and manage. Additionally, the value of the benefit could become taxable income to employees and would need to be reported on their W-2 forms.

Accordingly, what is desired is to solve problems relating to workplace services management, some of which may be discussed herein. Additionally, what is desired is to reduce drawbacks relating to providing curated services, some of which may be discussed herein.

BRIEF SUMMARY

The following portion of this disclosure presents a simplified summary of one or more innovations, embodiments, and/or examples found within this disclosure for at least the purpose of providing a basic understanding of the subject matter. This summary does not attempt to provide an extensive overview of any particular embodiment or example. Additionally, this summary is not intended to identify key/critical elements of an embodiment or example or to delineate the scope of the subject matter of this disclosure. Accordingly, one purpose of this summary may be to present some innovations, embodiments, and/or examples found within this disclosure in a simplified form as a prelude to a more detailed description presented later.

Methods, systems, and computer-readable media are disclosed for enabling next generation Work Place Services. Embodiments provide employers and employees with top notch, curated services like dry cleaning, car wash, ergonomic improvements, etc. In some embodiments, a cloud-based workplace service platform provides curated services with very little overhead by a customer's administrative staff. Aspects of curated services, such as set-up, scheduling, and payment are managed by the platform. A company using the platform can decide which services are to be made accessible to employees and whether services are employee paid, company subsidized, or company paid. The platform better positions customers with respect to services/benefits/perks when it comes time to recruit and retain employees in competitive environments.

A further understanding of the nature of and equivalents to the subject matter of this disclosure (as well as any inherent or express advantages and improvements provided) should be realized in addition to the above section by reference to the remaining portions of this disclosure, any accompanying drawings, and the claims.

In some embodiments, a method for managing vendor services provided at an employer service location includes provisioning, at a server computer, an item or service offered by a vendor at the employer service location. The method also includes receiving, at the server computer, an order for the provisioned item or service from an employee and communicating the received order to the vendor, the vendor capable of providing the item or service at the employer service location, wherein the employer location is associated with the employee and the item or service. The method also includes scheduling, by the server computer, a time for the vendor to provide the item or service at an employer service location based at least in part on at least one of an availability of an employee, availability of the vendor, or availability of the employer service location. The method also includes processing, by the server computer, a payment from at least one of the employee or employer for the ordered item or service and distributing the payment to the vendor.

In some embodiments, the method also includes sending a notification, by the server computer and to a mobile device or computer associated with the employee, upon arrival of the vendor at the employer service location to perform the ordered item or service. The method also includes sending a notification, by the server computer and to the mobile device or computer associated with the employee, upon the vendor fulfilling the ordered item or service.

In some embodiments, the method also includes receiving vendor profile data associated with the vendor, creating a vendor profile associated with the vendor using the received vendor profile data and retrieving the vendor profile in response to one or more vendor workflows.

In some embodiments, the method also includes receiving service profile data associated with the item or service offered by the vendor, creating a service profile in a service catalog using the received service profile data, and retrieving the service profile from the service catalog in response to one or more service workflows.

In some embodiments, the method also includes prior to creating the service profile in the service catalog, receiving data indicating approval by an administrator of the server computer of the received service profile data.

In some embodiments, the method also includes receiving employer profile data associated with the employer of the employee, creating an employer profile associated with the employer using the employer profile data retrieving the employer profile in response to one or more employer workflows, receiving employee profile data associated with the employee, creating an employee profile associated with the employee using the employee profile data, and retrieving the employee profile in response to one or more employee workflows.

In some embodiments, the method also includes in response to receiving the order for the item or service, generating a map of the employer location. The method also includes transmitting, by the server computer and to a mobile device associated with the vendor, the generated map of the employer location.

In some embodiments, scheduling the time for the vendor to provide the item or service is dynamically scheduled.

In some embodiments, the item or service comprises one or more assets comprising identifying data able to be scanned via a mobile device associated with the vendor. The method also includes generating, by the server computer, a notification in response to the identifying data being scanned by the mobile device associated with the vendor. The method also includes transmitting, by the server computer and to the mobile device associated with the employee, the generated notification.

In some embodiments, the method also determining one or more subsidies applicable to the ordered item or service, and prior to processing the payment from the employee, applying the one or more determined subsidies to the ordered item or service.

In some embodiments, a method for managing vendor services provided at an employer service location includes receiving, at a server computer, an order for a provisioned item or service from an employee and communicating the received order to the vendor. The method also includes gathering information about a vendor and an employer of the employee based at least in part on information associated with the received order, the vendor capable of providing the item or service at the employer service location, wherein the employer location is associated with the employee and the item or service. The method also includes generating data based at least in part on the information associated with the received order and the gathered information about the vendor and the employer. The method also includes transmitting the generated data to a mobile device associated with the vendor, wherein the generated data enables a user of the mobile device to be authenticated to deliver or perform the provisioned item or service.

In some embodiments, the gathered information about the vendor and the employer is gathered from a plurality of databases.

In some embodiments, the generated data comprises a quick response (QR) code.

In some embodiments, the generated data comprises encrypted data.

In some embodiments, the method also includes transmitting the gathered information about the vendor to a mobile device associated with the employee.

In some embodiments, the generated data enables the user of the mobile device to be authenticated to delivery or perform the provisioned item or service within a specified timeslot.

In some embodiments, the method also includes in response to receiving the order for the item or service, generating a map of the employer location and transmitting, by the server computer and to the mobile device associated with the vendor, the generated map of the employer location.

In some embodiments, access to the one or more locations within the employer location is granted based at least in part on the generated data.

In some embodiments, the generated data is scanned at the employer location, and wherein scanning the generated data at the employer location begins delivery or performance of the provisioned item or service.

In some embodiments, the information about the vendor and the employer of the employee is stored within one more databases.

In some embodiments, a method for managing vendor services provided at an employer service location includes receiving, at the server computer, information pertaining to a vehicle related item or service, wherein the information pertains to a key associated with an employee vehicle pertaining to the vehicle related item or service. The method also includes scheduling, by the server computer, a time for the vendor to provide the vehicle related item or service at an employer location based at least in part on availability of an employee and availability of the vendor. The method also includes transmitting, by the server computer, a first notification to a device associated with the employee based at least in part on a first scanning of the asset. The method also includes transmitting, by the server computer, a second notification to the device associated with the employee based at least in part on a second scanning of the asset.

In some embodiments, wherein the vehicle related item or service comprises at least one of a vehicle wash, vehicle refuel, or vehicle repair.

In some embodiments, wherein the vehicle related item or service comprises delivery of a package associated with the employee to the vehicle.

In some embodiments, the method also includes transmitting, by the server computer, a map comprising a location of the vehicle to a device associated with the vendor in response to the first scanning.

In some embodiments, the method also includes processing, by the server computer, a payment from the employee for the ordered item or service and distributing the payment to the vendor.

In some embodiments, the method also includes determining one or more subsidies applicable to the ordered item or service and prior to processing the payment from the employee, applying the one or more determined subsidies to the ordered item or service.

In some embodiments, the asset is associated with a personal tag registered with the server computer.

In some embodiments, the personal tag is associated with the employee.

In some embodiments, the personal tag comprises a quick response (QR) code.

In some embodiments, the method also includes receiving, at the server computer, information indicative of the employee taking possession of the asset based at least in part on a third scanning of the asset.

Other embodiments of the invention are directed to servers and systems that are configured to perform the above-described methods.

BRIEF DESCRIPTION OF THE DRAWINGS

Aspects of the disclosure are illustrated by way of example. In the accompanying figures, like reference numbers indicate similar elements.

FIGS. 8F-8G each illustrate an exemplary user interface on a mobile device that enables an employee to order a service in according with an embodiment of the present invention.

DETAILED DESCRIPTION

Figure 1:
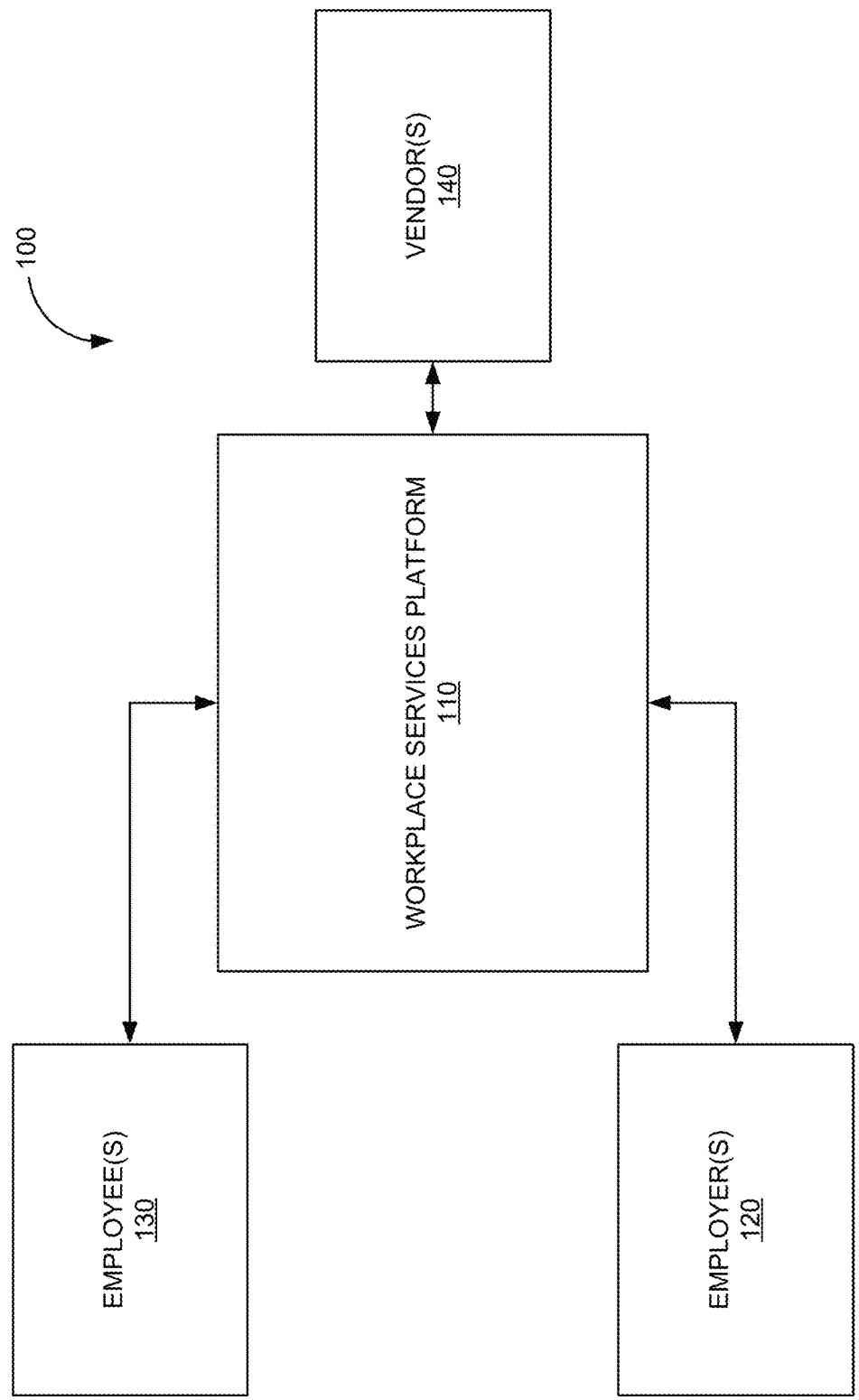
FIG. 1 is an illustration of workplace services environment, according to some embodiments.

Several illustrative embodiments will now be described with respect to the accompanying drawings, which form a part hereof. While particular embodiments, in which one or more aspects of the disclosure may be implemented, are described below, other embodiments may be used and various modifications may be made without departing from the scope of the disclosure or the spirit of the appended claims.

In the following description, for the purposes of explanation, specific details are set forth in order to provide a thorough understanding of embodiments of the invention. However, it will be apparent that various embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments. The figures and description are not intended to be restrictive. Rather, the ensuing description of the exemplary embodiments will provide those skilled in the art with an enabling description for implementing an exemplary embodiment. It should be understood that various changes may be made in the function and arrangement of elements without departing from the spirit and scope of the invention as set forth in the appended claims.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "machine-readable medium" or "computer-readable medium" includes, but is not limited to, portable or non-portable storage devices, optical storage devices, wireless channels, and various other mediums capable of storing, containing or carrying instruction(s) and/or data. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable or computer-readable medium. One or more processors may perform the necessary tasks.

Systems depicted in some of the figures may be provided in various configurations. In some embodiments, the systems may be configured as a distributed system where one or more components of the system are distributed across one or more networks in a cloud computing system. In further embodiments, the systems may be configured as a single system where one or more components of the system incorporated into a single structure or package.

One prior art solution for providing workplace services involves the traditional scenario where each employee as a consumer directly contacts each business for service. The employee usually acts alone and utilizes the platforms and resource of each given service provider. Scheduling between the employee and the service provider is usually quite simple. However, the employee alone may find it difficult to arrange for the service provider to have sufficient access to an employer's facility. Additionally, this must be separately arranged with the employer as well as dealing with any security issues when the service provider's employees are onsite. Finally, there is usually no subsidy from the employer.

Sometimes, services can be aggregated by a single vendor. This also facilitates scheduling with employees because multiple services can be requested from the same vendor. While aggregating with a single vendor can also resolve some access and security issues, employers are still faced with finding and managing vendors, arranging for access to facilities, ensuring security, as wells as providing how such services are offered as benefits to employees.

Embodiments relate to a fully automated workplace services platform. The workplace services platform solves some of the problems with the traditional methods discussed above for scheduling, access, security, and employer offerings. In some embodiments, the workplace services provides for dynamic scheduling that is automatic with respect to each asset being schedule, each employee ordering a service, each vendor providing a service, etc. In some embodiments, the workplace services platform handles access to an employer's facilities, using for example, a boarding pass style authentication and instruction mechanism. In some embodiments, the workplace services platform enhances security, for example, through the use of the above referenced boarding pass, facilitating vendor navigation, and vendor tracking.

In some embodiments, workplace services platform allows employers full control of how benefits are offered. Subsidies, vouchers, and other means can be readily implemented, tracked, and managed.

FIG. 1 is an illustration of workplace services environment 100, according to some embodiments. Procuring and providing workplace services often involves a plurality of participants, each of whom can play a well-defined role in the process. To facilitate discussion, FIG. 1 depicts in a simplified diagram the various participants that interact with the workplace services platform 110.

In the illustrated embodiment, each employer 120 has group of employees 130. In some embodiments, an employer 120 could be a large corporation. In other embodiments, the employer 120 could be a small company or sole proprietor. The various benefits the employer 120 can provide to its employees 130 can include employee rewards programs and workplace services including, for example, goods and services from a variety of vendors 140. In an embodiment, a cloud-based workplace services program is implemented using the services of workplace services platform 110.

Vendors 140 can include any vendor that can provide a product or service to the employees 130. The vendors 140 may provide the product or service at the employer's 120 place of business. For example, a vendor 140 can include a massage therapist.

Employer 120 can access the workplace services platform 110 via one or more communications networks, such as the Internet. For example, in an embodiment, employer 120 may access one or more online portals associated with workplace services platform 110 to define employees and employee rewards programs. In an embodiment, workplace services platform 110 stores such employee and program definitions in one or more databases. The workplace services platform 110 can include modules for building access, building security, scheduling, billing, etc.

During an employer registration process with the workplace services platform 110, an employer 120 may answer any questions about the employer's company, location, number of employees, the types of services to be offered to employees, payment and billing information, or the like. After the employer 120 is registered, the employer 120 may continue to interact with workplace services platform 110 from time to time to update company or employee information, to make changes to the services offered to employees, or the like.

Employee 130 may work for or through one or more of employer(s) 120. Some employees may work for a single employer. Other employees may work for multiple employers. Employee 130 can access workplace services platform 110 via one or more communications networks, such as the Internet. For example, in an embodiment, employee 130 may access employee rewards services to enroll in or claim benefits provided via workplace services platform 110. In an embodiment, workplace services platform 110 interfaces with employer 120 to debit and credit accounts maintained on behalf of employees 130 and to arrange for payment of vendors for goods and services purchased by employees 130. Examples of employees 130 can include an office manager, accountant, human resources manager, security, engineer, administrator, receptionist, etc.

It should be understood that the systems and network configurations illustrated in FIG. 1 are purely exemplary, and numerous other possible implementations will be readily apparent to those skilled in the art. For example, workplace services platform 110 could represent a single server or a cluster of servers. In other embodiments, workplace services platform 110 could represent one or more virtual servers, for example, within a cloud-based infrastructure. The infrastructure can reside in remote compute locations or on company premises.

Figure 2:
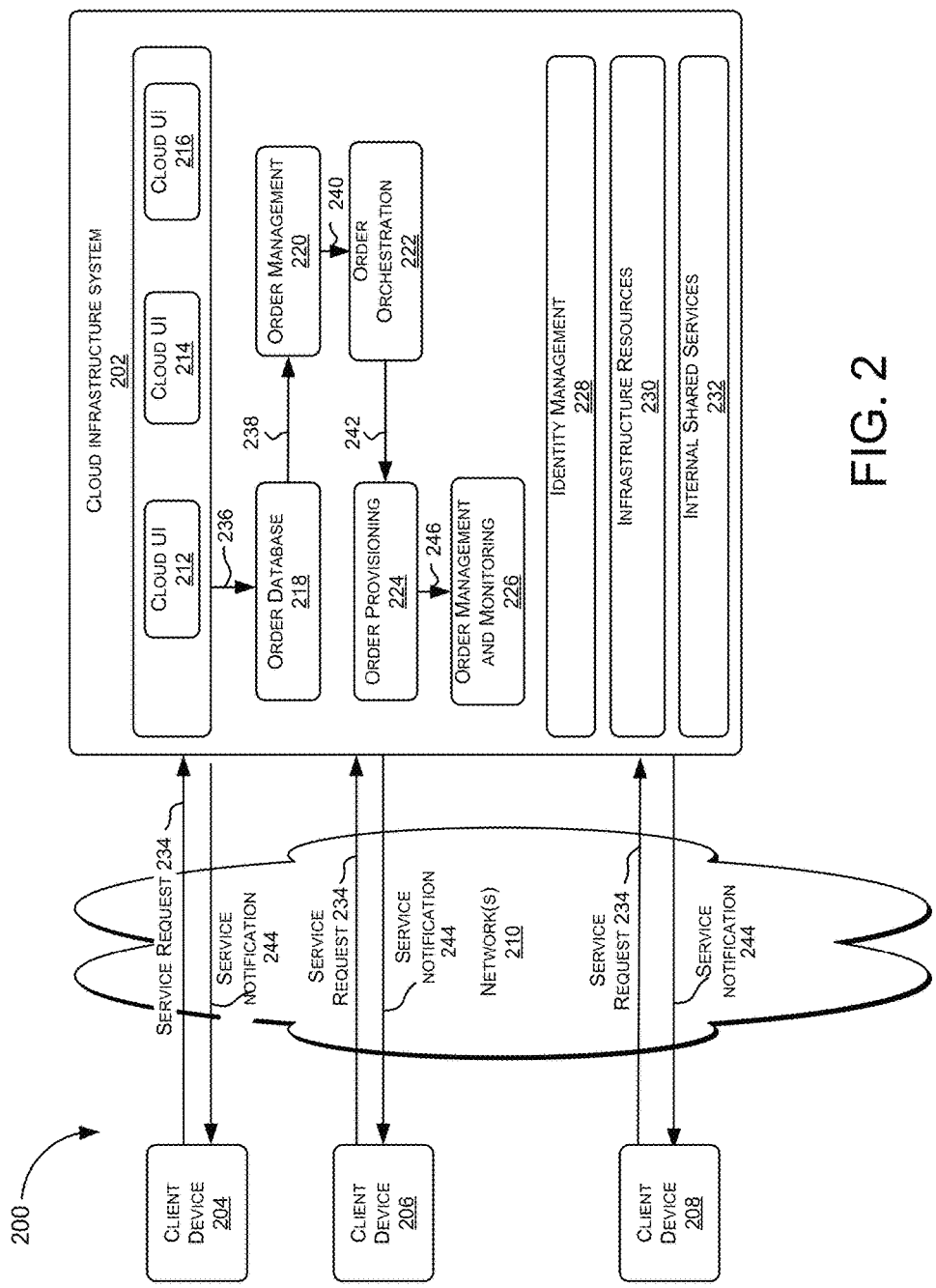
FIG. 2 is a simplified block diagram of one or more components of workplace services environment by which workplace services provided by one or more components of an embodiment system may be offered as cloud services, in accordance some embodiments.

FIG. 2 is a simplified block diagram of one or more components of workplace services environment 200 by which workplace services provided by one or more components of an embodiment system may be offered as cloud services, in accordance some embodiments. In the illustrated embodiment, workplace services environment 200 includes cloud infrastructure system 202 and one or more client computing devices 204, 206, and 208 that may be used by users to interact with cloud infrastructure system 202. Cloud infrastructure system 202 provides one or more cloud services associated with workplace services platform 110. The client computing devices may be configured to operate a client application such as a web browser, a proprietary client application, or some other application, which may be used by a user of the client-computing device to interact with cloud infrastructure system 202 to use services provided by cloud infrastructure system 202.

It should be appreciated that cloud infrastructure system 202 depicted in the figure may have other components than those depicted. Further, the embodiment shown in the figure is only one example of a cloud infrastructure system that may incorporate an embodiment of the invention. In some other embodiments, cloud infrastructure system 202 may have more or fewer components than shown in the figure, may combine two or more components, or may have a different configuration or arrangement of components.

Client computing devices 204, 206, and/or 208 may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 10, Palm OS, and the like, and being Internet, e-mail, short message service (SMS), Blackberry®, or other communication protocol enabled. The client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices 204, 206, and 208 may be any other electronic device, such as a thin-client computer, an Internet-enabled gaming system (e.g., a Microsoft Xbox gaming console with or without a Kinect® gesture input device), and/or a personal messaging device, capable of communicating over network(s) 210. Devices like scanners and barcode readers can also be integrated with the platform.

Although exemplary workplace services environment 200 is shown with three client computing devices, any number of client computing devices may be supported. Other devices such as devices with sensors, etc. may interact with cloud infrastructure system 202.

Network(s) 210 may facilitate communications and exchange of data between clients 204, 206, and 208 and cloud infrastructure system 202. Network(s) 210 may be any type of network familiar to those skilled in the art that can support data communications using any of a variety of commercially-available protocols, including without limitation TCP/IP (transmission control protocol/Internet protocol), SNA (systems network architecture), IPX (Internet packet exchange), AppleTalk, and the like. Merely by way of example, network(s) 210 can be a local area network (LAN), such as one based on Ethernet, Token-Ring and/or the like. Network(s) 210 can be a wide-area network and the Internet. It can include a virtual network, including without limitation a virtual private network (VPN), an intranet, an extranet, a public switched telephone network (PSTN), an infra-red network, a wireless network (e.g., a network operating under any of the Institute of Electrical and Electronics (IEEE) 802.11 suite of protocols, Bluetooth®, and/or any other wireless protocol); and/or any combination of these and/or other networks.

Cloud infrastructure system 202 may comprise one or more computers and/or servers composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. In various embodiments, a server may be adapted to run one or more services or software applications described in the foregoing disclosure. A server may run an operating system including any of those discussed above, as well as any commercially available server operating system. A server may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle, Microsoft, Sybase, IBM (International Business Machines), and the like.

Cloud infrastructure system 202 may provide services via different deployment models. For example, services may be provided under a public cloud model in which cloud infrastructure system 202 is owned by an organization selling the services and the services are made available to the general public or different enterprises. As another example, services may be provided under a private cloud model in which cloud infrastructure system 202 is operated solely for a single organization and may provide services for one or more entities within the organization. The services may also be provided under a community cloud model in which cloud infrastructure system 202 and the services provided by cloud infrastructure system 202 are shared by several organizations in a related community. The cloud services may also be provided under a hybrid cloud model, which is a combination of two or more different models.

In one exemplary mode of operation, a participant (e.g., an employer, employee, or vendor) may access cloud infrastructure system 202. Cloud infrastructure system 202 then performs processing to provide the participant access to tools to perform one or more participant-specific actions.

In some embodiments, cloud infrastructure system 202 may perform one or more participant-specific action that may include, without limitation, actions with respect to one or more employees of an organization. Cloud infrastructure system 202 can provide profile management, access to preferred vendors, listing and cataloging of curated services, order management and scheduling, billing and accounting, notification, reporting, or the like with respect to an employee. Cloud infrastructure system 202 can provide capabilities that allow an employee to find goods, services, vendors, etc. to which an employer has provide access via cloud infrastructure system 202. Cloud infrastructure system 202 can provide capabilities that allow an employee to order goods and/or services, schedule delivery or service dates, engage in purchases, and/or arrange for delivery of goods and/or services to employees.

In some embodiments, cloud infrastructure system 202 may perform one or more participant-specific action that may include, without limitation, actions with respect to one or more employers. Cloud infrastructure system 202 can provide profile management, access to preferred vendors, listing and cataloging of curated services, order management and scheduling, billing and accounting, reporting, or the like with respect to an employer. Cloud infrastructure system 202 can provide capabilities that allow an employer to find preferred vendors, such as have been licensed and/or bonded. Cloud infrastructure system 202 can provide capabilities that allow an employer to facilitate the ordering, scheduling, purchasing, and delivery of goods and/or services to employees of the employer.

In some embodiments, cloud infrastructure system 202 may perform one or more participant-specific action that may include, without limitation, actions with respect to one or more vendors. Cloud infrastructure system 202 can provide profile management, listing and cataloging of curated services, order management and scheduling, billing and accounting, reporting, or the like with respect to a vendor. Cloud infrastructure system 202 can provide capabilities that allow a vendor to register goods and/or services to be offered to other participants. Cloud infrastructure system 202 can provide capabilities that allow a vendor manage orders, scheduling, purchases, and delivery of goods and/or services to employees.

In some embodiments, platform services may be provided by cloud infrastructure system 202. Examples of platform services may include without limitation services that enable organizations to build portals, e-commerce sites, reward programs, and marketing campaigns. Cloud infrastructure system 202 may manage and control the underlying software and infrastructure for providing the services. By utilizing the platform services provided by cloud infrastructure system 202, customers can employ wizards, templates, programming languages and tools supported by cloud infrastructure system 202 to design, implemented, and control the deployed services. In some embodiments, platform services provided by cloud infrastructure system 202 may include the use of database services, middleware services, and application services.

Various different infrastructure services may be provided by cloud infrastructure system 202. The infrastructure services facilitate the enrollment of participants, management of participants, orders, goods, services, etc., and scheduling. In one embodiment, as depicted in the figure, functionality may be provided by one or more modules, such as an order management module 220, an order orchestration module 222, an order provisioning module 224, an order management and monitoring module 226, and an identity management module 228. These modules may include or be provided using one or more computers and/or servers, which may be general purpose computers, specialized server computers, server farms, server clusters, or any other appropriate arrangement and/or combination. In exemplary operation 234, a participant using a client device, such as client device 204, 206 or 208, may interact with cloud infrastructure system 202. In certain embodiments, the participant may access a cloud User Interface (UI), cloud UI 212, cloud UI 214, and/or cloud UI 216.

In one embodiment, a participant may request access to one or more functions provided by cloud infrastructure system 202, such as placing an order for one or more services. For example, order information can be received by cloud infrastructure system 202 in response to an employee placing an order may include information identifying the customer and one or more services offered by the cloud infrastructure system 202. As indicated above, the order can be placed by the customer via the cloud UIs, 212, 214, and/or 216. At operation 236, the order can be stored in order database 218. Order database 218 can be one of several databases operated by cloud infrastructure system 202 and operated in conjunction with other system elements.

At operation 238, the order information can be forwarded to an order management module 220. In some instances, order management module 220 may be configured to perform billing and accounting functions related to the order, such as verifying the order, and upon verification, booking the order. At operation 240, information regarding the order can be communicated to an order orchestration module 222. Order orchestration module 222 may utilize the order information to orchestrate the provisioning, scheduling, etc. of services and resources for the order placed by the customer. In some instances, order orchestration module 222 may orchestrate with one or more vendors using the services of order provisioning module 224.

In certain embodiments, order orchestration module 222 enables the management of business processes associated with each order and applies business logic to determine whether an order should proceed to provisioning. At operation 242, upon receiving an order, order orchestration module 222 sends a request to order provisioning module 224. Order provisioning module 224 interacts with a vendor to allocate resources for the services ordered by the customer.

At operation 244, once the services are ordered and provisioned, a notification of the ordered service may be sent to customers on client devices 204, 206 and/or 208 by order provisioning module 224 of cloud infrastructure system 202. At operation 246, the customer's order may be managed and tracked by an order management and monitoring module 226. In some instances, order management and monitoring module 226 may be configured to collect usage statistics for the goods and/or services in the order.

In certain embodiments, cloud infrastructure system 202 may include an identity management module 228. Identity management module 228 may be configured to provide identity services, such as access management and authorization services in cloud infrastructure system 202. In some embodiments, identity management module 228 may control information about participants who utilize cloud infrastructure system 202. Such information can include information that authenticates the identities of such participants and information that describes which actions those participants are authorized to perform relative to various system resources (e.g., files, directories, applications, communication ports, memory segments, etc.) Identity management module 228 may also include the management of descriptive information about each participant and about how and by whom that descriptive information can be accessed and modified.

Figure 3:
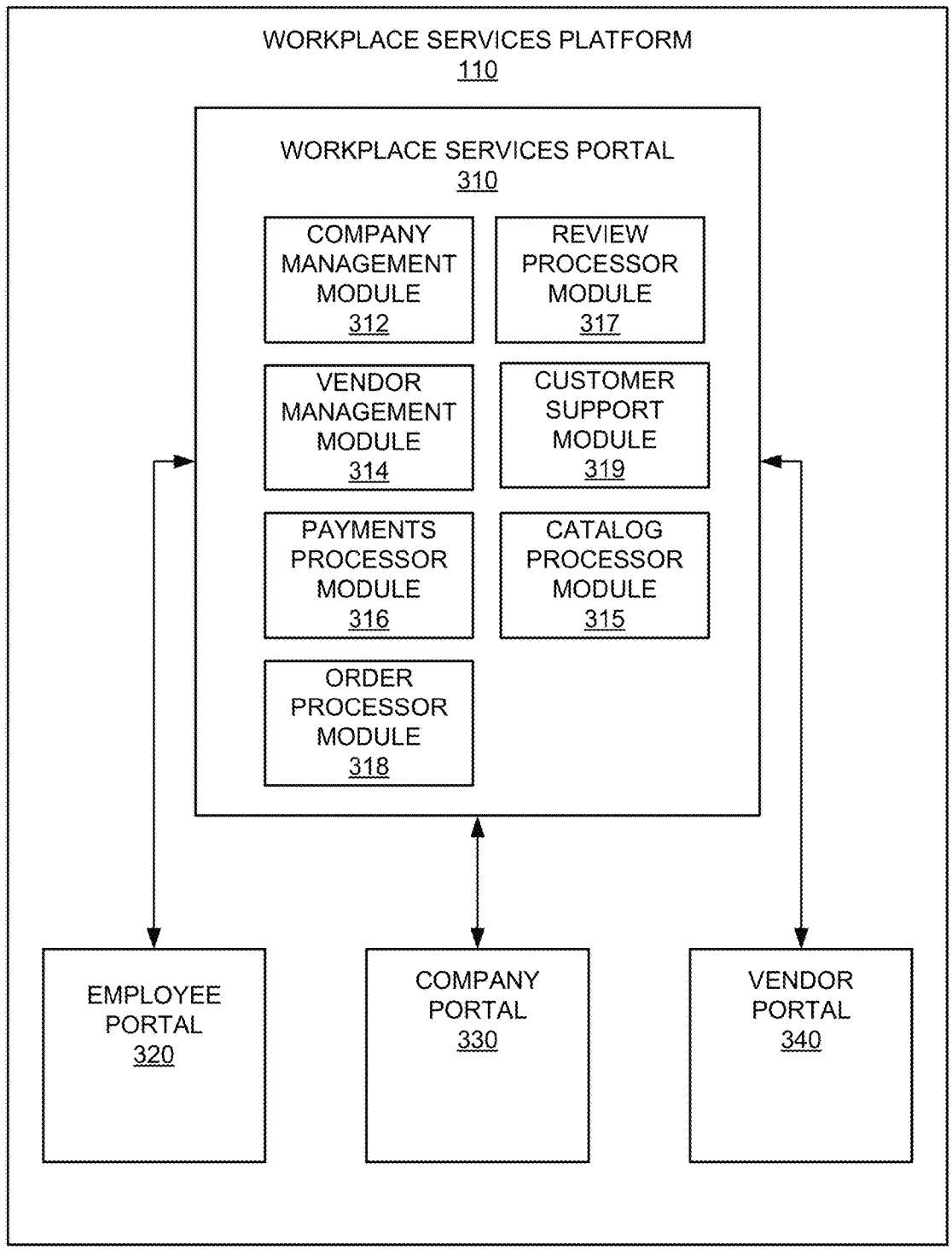
FIG. 3 illustrates one or more functional components of workplace services platform in accordance with one embodiment of the present invention

FIG. 3 illustrates one or more functional components of workplace services platform 110 in accordance with one embodiment of the present invention. In this illustration, workplace services platform 110 of FIG. 1 includes workplace services portal 310, employee portal 320, company portal 330, and vendor portal 340. Each of the components of the workplace services platform 110 are described in further detail below.

Figure 4:
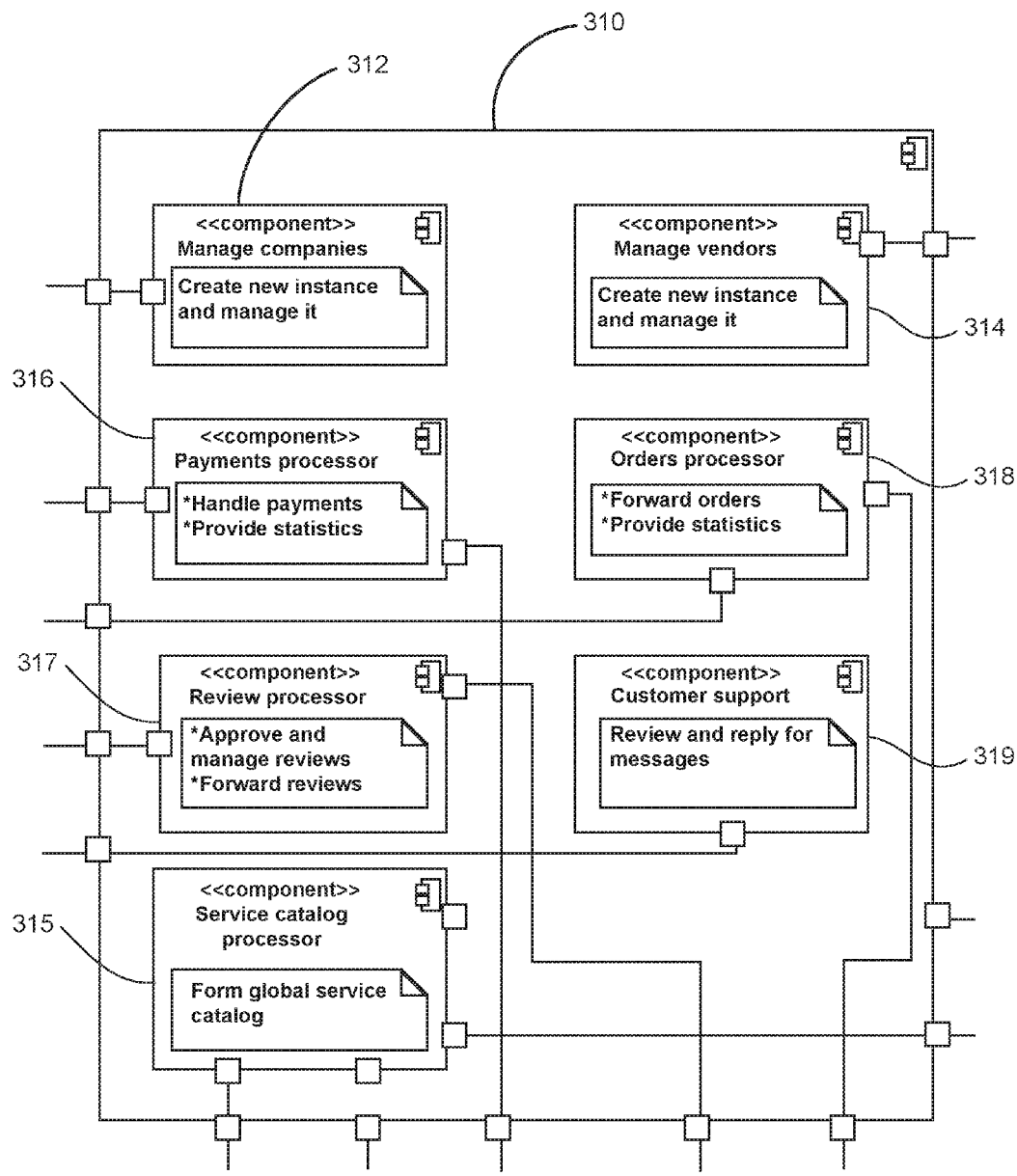
FIG. 4 illustrates one or more functional components of workplace services portal in accordance with some embodiments.

FIG. 4 illustrates one or more functional components of workplace services portal 310 in accordance with some embodiments. Workplace services portal 310 may include hardware and/or software elements that enable access to various components of workplace services platform 110. For example, workplace services portal 310 can include a company management module 312 that allows an administrator to manage one or more companies that have access to workplace services platform 110. The company management module 312 can allow an administrator to create a new company profile and manage the company. The administrator can define the vendors to which the company has access, the goods and/or services to which employees of the company have access, marketing, or benefits programs available to the company, or the like. The company management module 312 can further be accessible to the company as a self-service feature allowing an employee of the company, such as the CEO or human resources specialist, to manage the company's information.

Workplace services portal 310 can include a vendor management module 314 that allows an administrator to manage one or more vendors that have access to workplace services platform 110. The vendor management module 314 can allow an administrator to create a new vendor profile and manage the vendor. The administrator can define the companies and/or employees to which the vendor has access, the goods and/or services that the vendor may offer, marketing or benefits programs that the vendor offers to companies, or the like. The vendor management module 314 can further be accessible to each vendor as a self-service feature allowing an employee of the vendor to manage the vendor's information.

Workplace services portal 310 can include a payments processor module 316 that allows payments to be processed via workplace services platform 110. The payments processor module 316 can handle payments using a variety of forms by integrating with other payment processors and networks. The payments processor module 316 can further provide payment processing statistics and reports on any handled payment.

Workplace services portal 310 can include an order processor module 318 that allows orders to be processed via workplace services platform 110. The order processor module 318 can receive orders received from participants and forward the orders to appropriate destinations. The order processor module 318 can further provide order statistics and reports on any handled orders.

Workplace services portal 310 can include a review processor module 317 that allows reviews to be processed via workplace services platform 110. The review processor module 317 can receive reviews and/or comments from participants and forward the reviews to appropriate destinations. The review processor module 317 can further provide moderation and reports on any handled reviews. For example, the review processor module 317 can store review data in a database.

Workplace services portal 310 can include a customer support module 319 that allows participants to receive support via workplace services platform 110. The customer support module 319 can receive requests for support and forward the request to appropriate destinations. For example, the customer support module 319 may forward one type of request to a vendor for support, a second type of request to an employer for support, a third type of request to an administrator of workplace services platform 110, or the like. The customer support module 319 can further provide frequently answered questions (FAQs) and other knowledge bases for assisting in handling support requests.

Workplace services portal 310 can also include a service catalog processor module 315 that forms a global catalog of goods and/or services offered via workplace services platform 110. The service catalog processor module 315 can receive information describing goods and/or services and catalog the information according to predetermined criteria, such as price, type, class of service, or the like.

Figure 5:
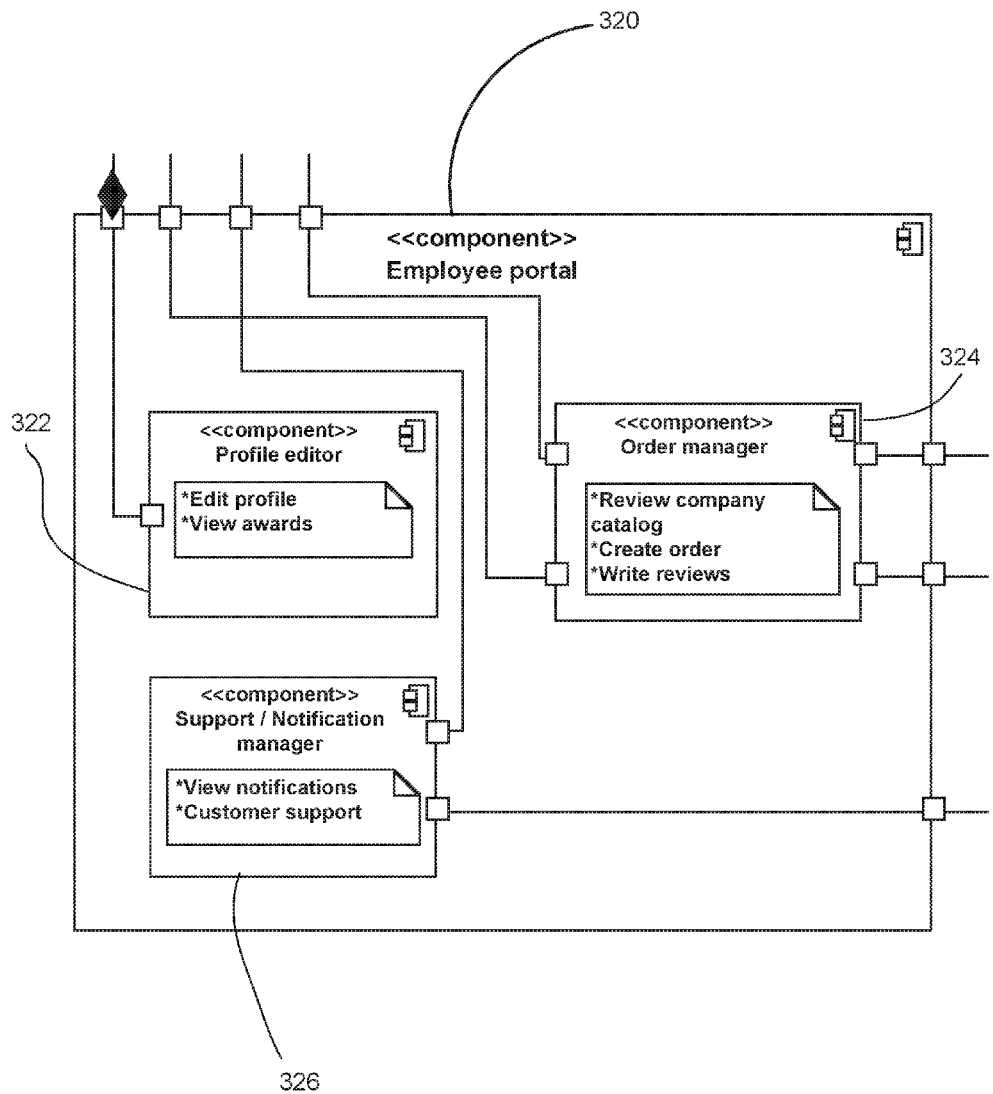
FIG. 5 illustrates one or more functional components of employee portal in accordance with some embodiments.

FIG. 5 illustrates one or more functional components of employee portal 320 in accordance with some embodiments. Employee portal 320 can also include hardware and/or software elements that enable employees to access to various components of workplace services platform 110 via workplace services portal 310.

Employee portal 320 can include a profile editor module 322 that allows an employee to create and manage an employee profile. The profile editor module 322 can receive employee information directly from an employee or from a company representative to create a profile. The profile editor module 322 can include functionality that enables the employee to view personal information, payment information, order processing and history information, purchase histories, accrued awards and other benefits, or the like.

Employee portal 320 can include an order manager module 324 that allows an employee to review a catalog of goods and/or services available to the employee's company. The order manager module 324 can receive order information and cause the order to be placed using workplace services platform 110. The order manager module 324 can include functionality that enables the employee read and write reviews for goods and/or services available to the employee's company through workplace services platform 110.

Employee portal 320 can include support/notification module 326 that allows an employee to access, view notifications, and receive support via workplace services platform 110.

Employee portal 320 can interface with one or more components of company portal 330. Company portal 330 includes hardware and/or software elements that enable companies to access to various components of workplace services platform 110 via workplace services portal 310.

Figure 6:
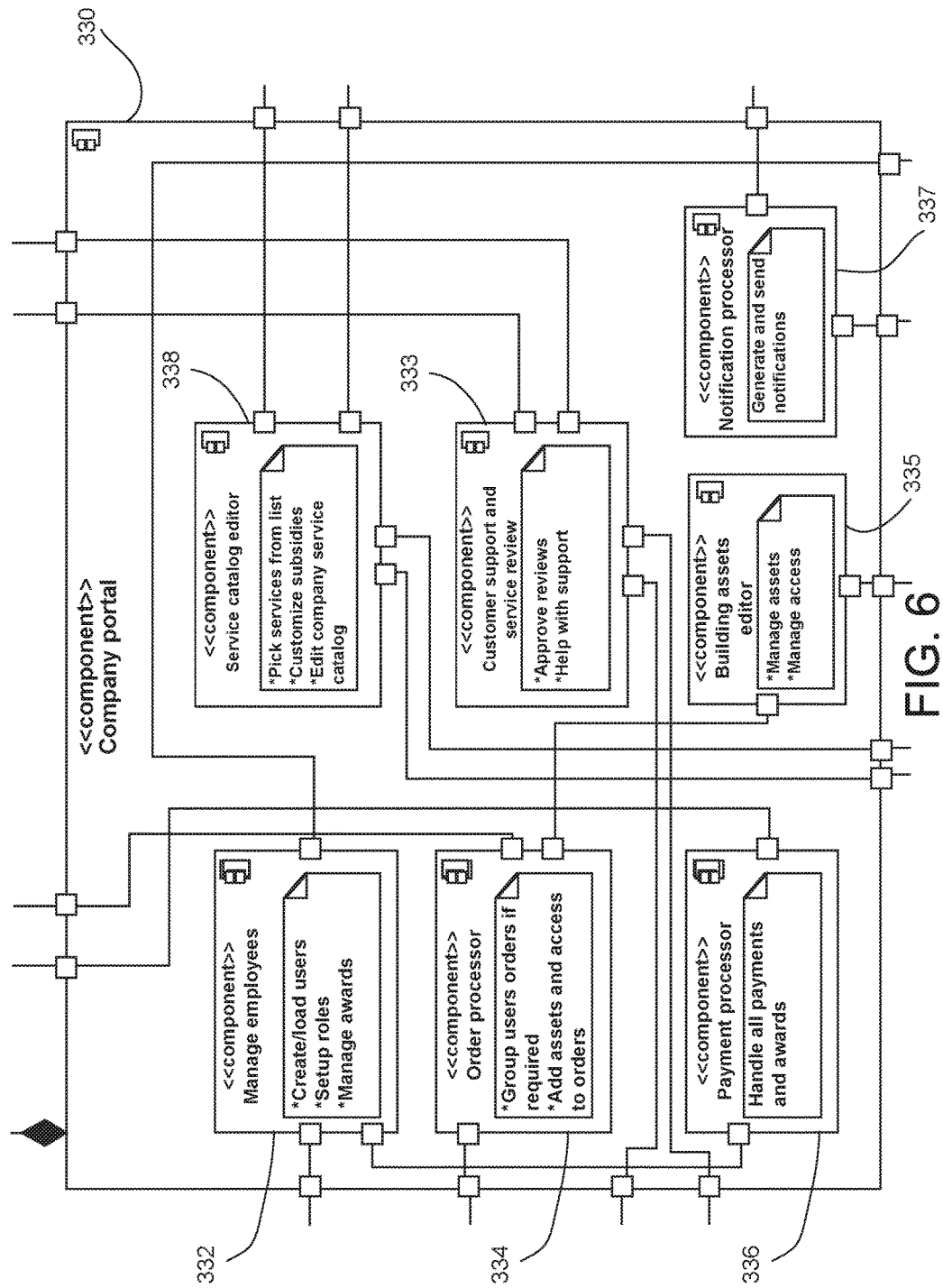
FIG. 6 illustrates one or more functional components of company portal in accordance with some embodiments.

FIG. 6 illustrates one or more functional components of company portal 330 in accordance with some embodiments. Company portal 330 can include a manage employees module 332 that allows an employer to manage company employees. The manage employees module 332 can create, update, load, and manage employee profiles and employee information. The manage employees module 332 can include functionality that enables the employer to set up one or more roles, such as user or administrator roles, or participants. The manage employees module 332 can include functionality that enables the employer to establish awards and other benefits accessible to the employees. The manage employees module 332 of company portal 330 can interface with the profile editor module 322 of employee portal 320.

Company portal 330 can include an order processor module 334 that allows an employer to manage orders made by employees. The order processor module 334 can group users' orders if required by a vendor. The order processor module 334 can include functionality that allows employers to register assets that may be used in conjunction with order processing, such as building locations, drop boxes, item tags, and the like. The order processor module 334 can include functionality that enables the employer to access employee orders. The order processor module 334 of company portal 330 can interface with the order manager module 324 of employee portal 320. The order processor module 334 of company portal 330 can further interface with the order processor module 318 of workplace services portal 310 to service orders made through company portal 330.

Company portal 330 can include a payments processor module 336 that allows payments to be processed via workplace services platform 110 using instructions from the employer. The payments processor module 336 can handle payments using the employer's accounting practices and paycheck processing. The payments processor module 336 can further manage whether an employee is awarded an additional awards and/or benefits that become available to the employee. The payments processor module 336 can further provide payment processing statistics and reports on any handled payment. The payments processor module 336 of company portal 330 can interface with the manage employees module 332 of company portal 330 to handle payments using employee financial information. The payments processor module 336 of company portal 330 can further interface with the payments processor module 316 of workplace services portal 310 to facilitate payments made through company portal 330.

Company portal 330 can include a service catalog editor module 338 that accesses the catalog processor module of workplace services portal 310. The service catalog editor module 338 can include functionality that enables the employer to pick services from a list of curated services from licensed and pre-approved vendors. The service catalog editor module 338 can include functionality that enables the employer to customize subsidies for the offered goods and/or services. The service catalog editor module 338 can include functionality that enables the employer the edit and manage the company's custom services catalog. The service catalog editor module 338 of company portal 330 can interface with the order manager module of employee portal 320.

Company portal 330 can include a customer support and service review module 333 that enables an employer to manage help with support and manage reviews. The customer support and service review module 333 can receive reviews and/or comments from participants and forward the reviews to the review processor module of workplace services portal 310. The customer support and service review module 333 can receive support requests from participants and forward the requests to the customer support module 319 of workplace services portal 310.

Company portal 330 can include a building asset editor module 335 that enables an employer to manage assets and access. An asset can include a physical location or item that is to be managed by an employer. Some examples of assets include parking lots, buildings, rooms, lockers, bins, item tags, or the like. Every building asset for the purpose of workplace services can be tagged and identified on a map. Further examples include a Cafeteria, Dry-cleaning/Laundry closet, Car key box, Massage room, etc. Assets or tags can be scanned to indicate an event, such as a food delivery event, a car key pickup or return event, massage is waiting, etc. The building asset editor module 335 can also include functionality that manages access to various assets. The building asset editor module 335 can interface with the order processor module 334 of company portal 330 allowing designated assets to be identified and utilized in conjunction with workplace services being ordered.

Company portal 330 can include a notification processor module 337 that enables the employer to define notifications based on events. The notification processor module 337 can generate notification based on one or more events being triggered. The notification processor module 337 may generate email notifications, SMS text message notification, instant messaging notification, or the like. The notification processor module 337 of company portal 330 can interface with the support/notification manager 326 module of employee portal 320.

In some embodiments, company portal 330 can provide a receptionist page that allows a receptionist or other office manager to access company portal 330 as an administrator. The receptionist page can interface with, for example, the building asset editor module 335 to allow a participant to manage assets and access. The receptionist page can interface with, for example, the notification processor module 337 to allow a participant to receive and manage notifications that may pertain to other participants. For example, a receptionist may be notified that a food delivery has occurred and that the vendor should be leaving the building.

Figure 7:
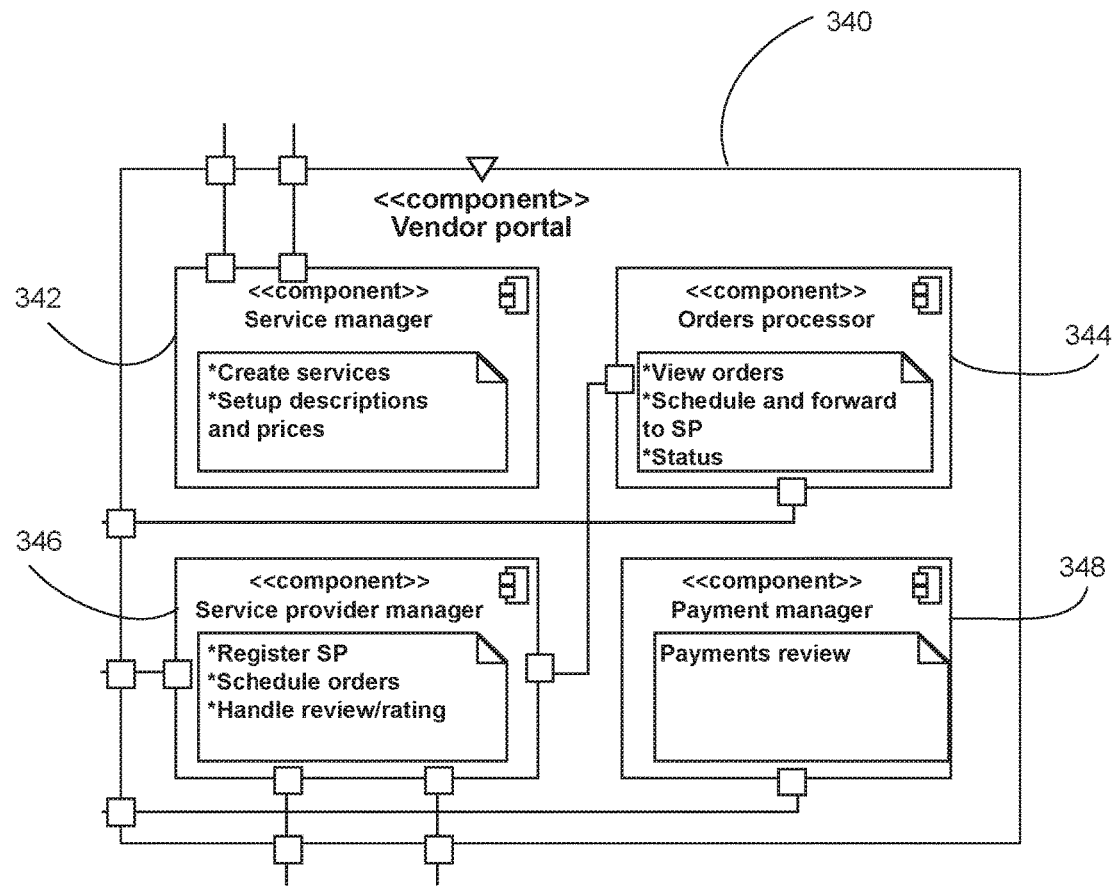
FIG. 7 illustrates one or more functional components of vendor portal in accordance with some embodiments.

FIG. 7 illustrates one or more functional components of vendor portal 340 in accordance with some embodiments. Vendor portal 340 includes hardware and/or software elements that enable vendors to access to various components of workplace services platform 110 via workplace services portal 310.

Vendor portal 340 can include a service manager module 342 that allows a vendor to manage goods and/or services offered via workplace services platform 110. The service manager module can be used to create, update, load, and manage information about offered goods and/or services. The service manager module 342 can include functionality that enables the vendor to set up descriptions, prices, quantities, etc. The service manager module 342 of vendor portal 340 can interface with the service catalog processor module 315 of workplace services platform 110.

Vendor portal 340 can include an order processor 344 module that allows a vendor to manage orders made through workplace services platform 110. The order processor module 344 can include functionality that allows vendors to view orders, schedule orders, and view and/or indicated the status of orders. The order processor module 344 of vendor portal 340 can interface with the order processor module 346 of workplace services platform 110. The order processor module 344 of company portal 330 can further interface with a service provider manager module 346 that allows vendors to manager their vendor profile.

The service provider manager module 346 can include functionality that enables a vendor to register as a service provider, schedule and manage orders, and handle reviews or support requests. The service provider manager module 346 of vendor portal 340 can interface with the review processor module 317 of workplace services platform 110.

Vendor portal 340 can include a payments manager module 348 that allows vendors to manage payments processed via workplace services platform 110. The payments processor module 348 of vendor portal 340 can interface with the payments processor module 316 of workplace services platform 110 to handle payments.

In some embodiments, vendor portal 340 can provide a service provider page that allows a service provide or other vendor representative to access vendor portal 340. Access may be provided as an administrator or as an employee of the service provider. The service provider page can interface with, for example, the service provider manager module to allow a participant to manage a vendor profile, order scheduling, order status, etc. The service provider page can interface with, for example, the notification module of company portal 330 to allow a receptionist to receive information about a vendor that is delivering a goods or service.

In various embodiments, an employee can receive an invitation (e.g., via email or text message) to participate in one or more workplace services programs offered by an employer. In one embodiment, the employee can enroll in the programs by clicking on a link in the invitation. The employee can then access an employee portal (e.g., employee portal 320 of FIG. 5) to create an account and view and customize goods or services offered in the programs.

Figure 8A:
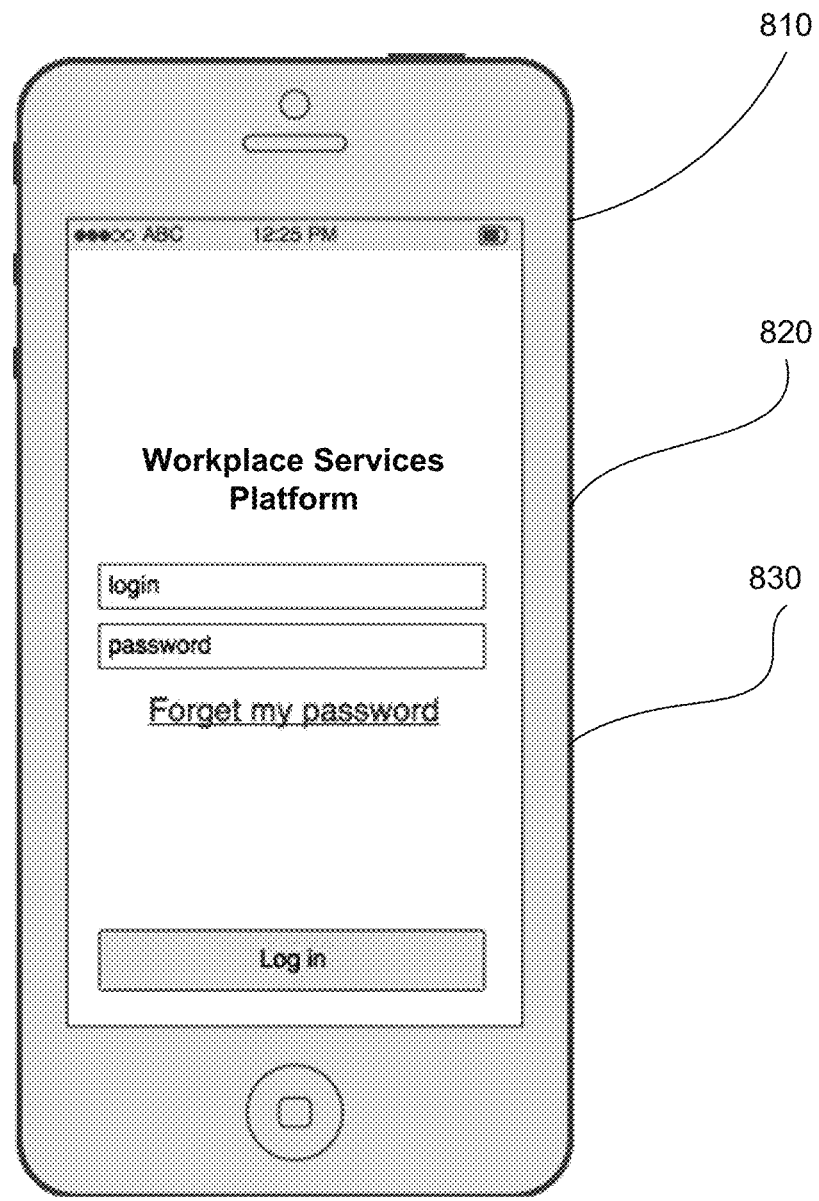
FIG. 8A illustrates an exemplary user interface on a mobile device that enables an employee to participate in one or more workplace services program in accordance with some embodiments.

FIG. 8A illustrates an exemplary user interface on a mobile device 810 that enables an employee to participate in one or more workplace services program in accordance with some embodiments. In some embodiments, the mobile device 810 may be any one of client devices 204, 206, 208. In the illustrated embodiment, the entry point to the employee portal for the employee may be a login screen 820 displayed within a user interface on the display 830 of the mobile device 810. On this screen, the employee can enter a login username and password.

In some embodiments, an employee can receive an invitation (e.g., via email or text message) to participate in one or more workplace services programs offered by an employer. In some embodiments, the employee can enroll in the programs by clicking on a link in the invitation. The employee can then access an employee portal (e.g., employee portal 320 of FIG. 3) to create an account and view and customize goods or services offered in the programs.

In some embodiments, an employee main page may show an account link and services available. The services available can include a picture of the service and description. One or more buttons may be used to access service information, to order the service, to view a schedule of the vendor (i.e. when a massage is available), to view related building Asset (when Massage room is available), to view potential discounts if ordered together with colleagues, e.g. 3 massages are cheaper than 1 due to reduced travel overhead, to view service statues (e.g., where is the service provider (track location based on provider GPS) or estimated arrival time), to view order history, or to view reviews, etc.

Figure 8C:
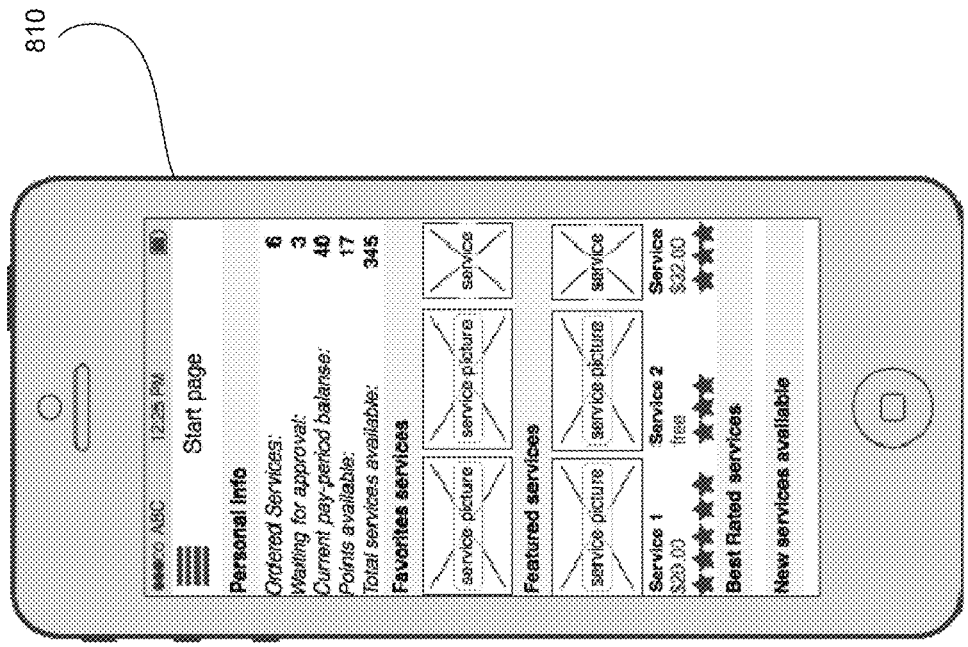
FIG. 8C illustrates an exemplary user interface on a mobile device that enables an employee to interact with one or more workplace services in accordance with some embodiments.
Figure 8B:
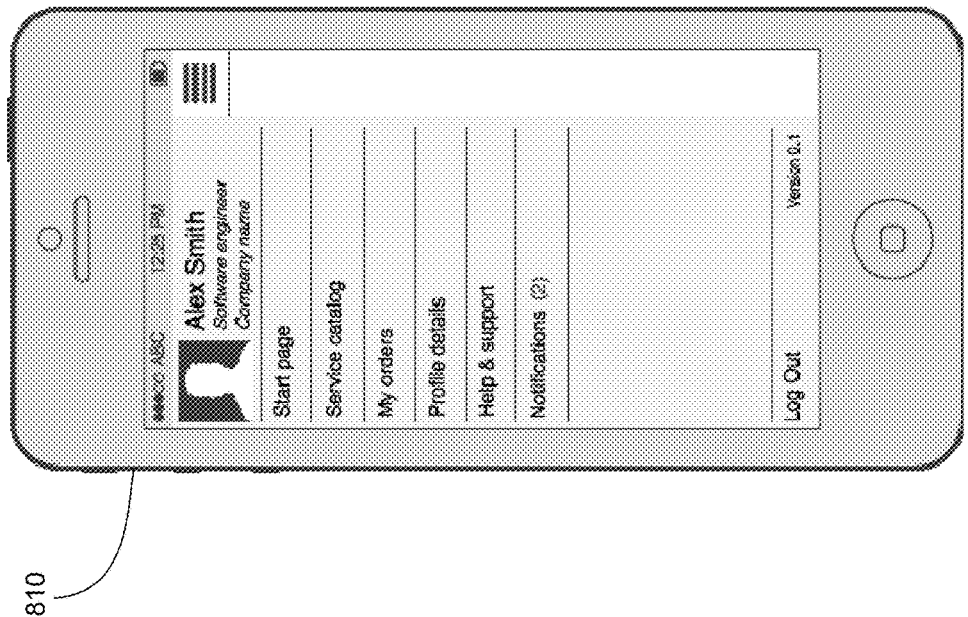
FIG. 8B illustrates an exemplary user interface on a mobile device that enables an employee to begin participating in one or more workplace services programs in accordance with some embodiments.

FIG. 8B illustrates an exemplary user interface on a mobile device 810 that enables an employee to begin participating in one or more workplace services programs in accordance with some embodiments. The user interface may provide various navigation options to the employee. For example, the user interface may provide "start page", "service catalog", "my orders", "profile details", "help & support", and "notifications" navigation options for the user. In some embodiments, the navigation options may be presented in a sidebar within the user interface that can be open/closed by the employee.

FIG. 8C illustrates an exemplary user interface on a mobile device 810 that enables an employee to interact with one or more workplace services in accordance with some embodiments. In the illustrated embodiment, several categories are shown that advertise services that are available to the employee inside the company. The employee can be provided with information, such as a service picture, name, rating, and price.

In some embodiments, the interface can additionally provide additional elements that allow the employee to search for other services using, for example, category selections and/or free form search queries. In some embodiments, the interface displays the employer's and the employee's respective co-payment amounts. In some embodiments, when an employee searches for services using, for example, the category or free form search queries, the interface can display service details utilizing the user interface shown. In the illustrated embodiment, for a given service, the interface can displays the name of the vendor providing the service, details about the service, the required payment for the service, and controls that permit the employee to purchase the service, review the service, or the like.

Vendors can create services and group them into a service catalog. FIG. 8D illustrates an exemplary user interface on a mobile device 810 that enables an employee to interact with a service catalog in accordance with some embodiments. Companies have access to common services catalog and can add them into their custom catalog with customized services (with added subsidies etc.). In some embodiments, employees may have access only to services that are designed by their employer. After a user selects certain a service category, a list of available services can be shown. Services can be approved by a company administrator and customized regarding prices, assets buildings, access to them, vendor name, brief description and icon, price, available date, etc.

Figure 8E:
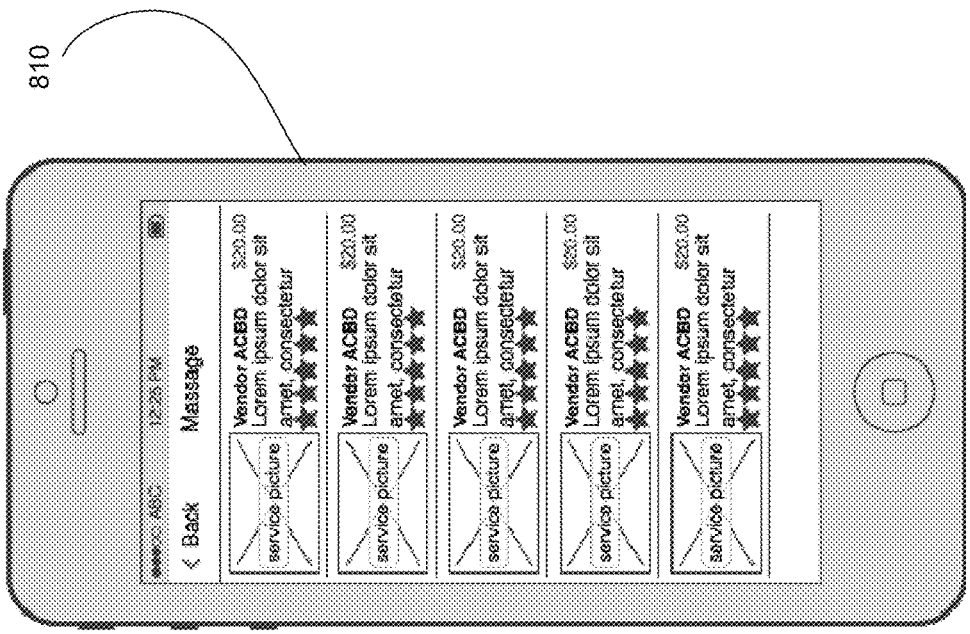
FIG. 8E illustrates an exemplary user interface on a mobile device that enables an employee to interact with service details in accordance with some embodiments.
Figure 8D:
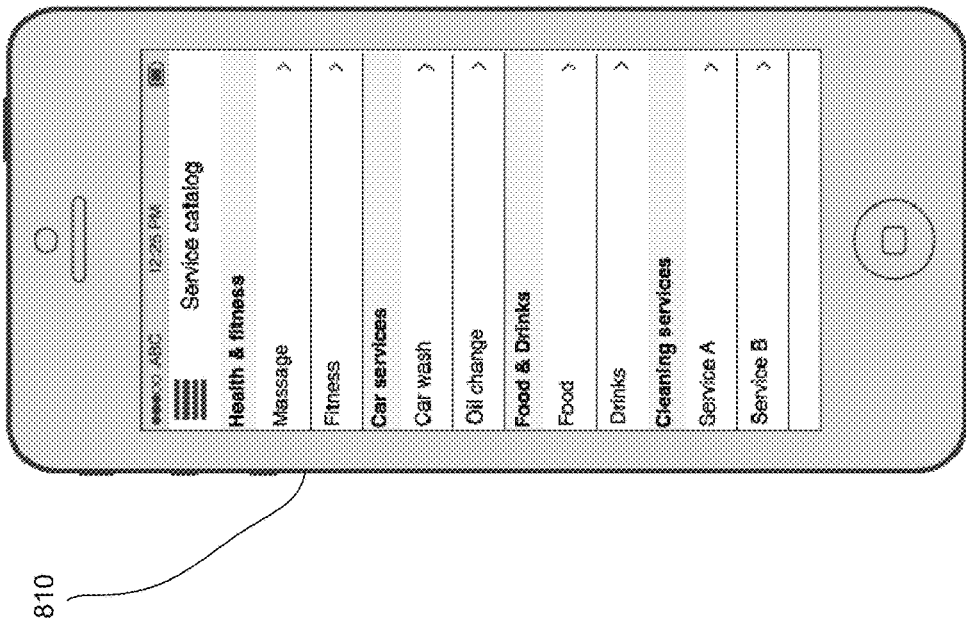
FIG. 8D illustrates an exemplary user interface on a mobile device that enables an employee to interact with a service catalog in accordance with some embodiments.

FIG. 8E illustrates an exemplary user interface on a mobile device 810 that enables an employee to interact with service details in accordance with some embodiments. The illustrated embodiment provides service name, vendor name, duration, icon, list of service providers, schedule, price including subsidy, service location and building asset. The rating can be based on reviews if available.

FIGS. 8F-8G each illustrate an exemplary user interface on a mobile device that enables an employee to order a service in according with an embodiment of the present invention. By pressing "Order service," the user can see one or more additional fields with date, time, and service provider. The list of fields depends on the service type. User may also pick a service provider if more than 1 is available for some services.

Figure 8H:
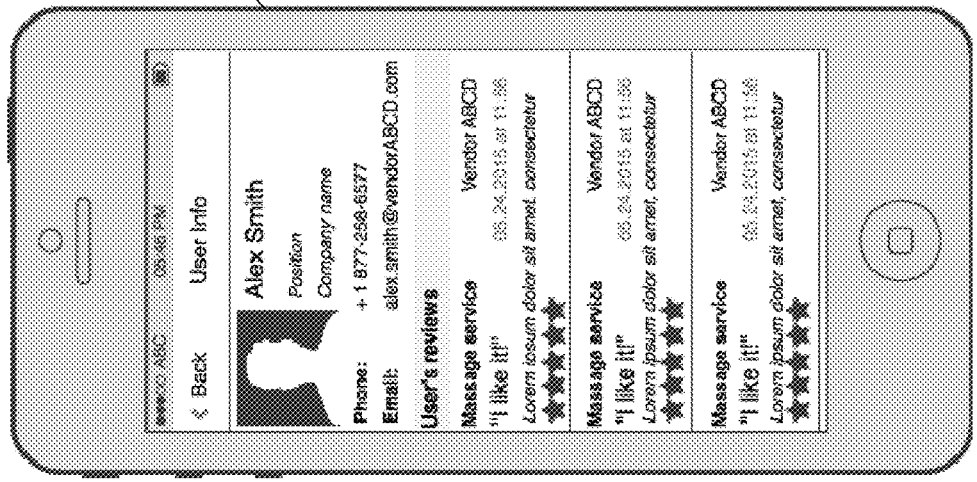
FIG. 8H illustrates an exemplary user interface on a mobile device that enables an employee to review service provider information in accordance with some embodiments.

FIG. 8H illustrates an exemplary user interface on a mobile device that enables an employee to review service provider information in accordance with some embodiments. A user can visit the service provider screen to review personal details, such as name, title, vendor name, age, contact information, personal description, insurance, background checking form, and photo. This info can be provided by the vendor using vendor portal 340 of FIG. 3.

Figure 8I:
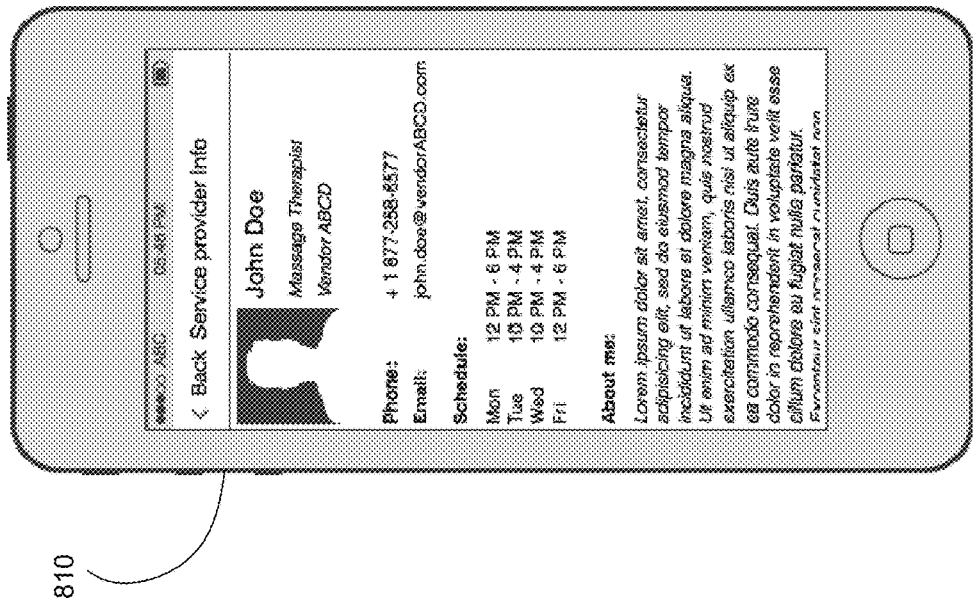
FIG. 8I illustrates an exemplary user interface on a mobile device that enables an employee to review employee profile information in accordance with some embodiments.

FIG. 8I illustrates an exemplary user interface on a mobile device that enables an employee to review employee profile information in accordance with some embodiments. The screen can consist of basic information available for other users and for the company administrator. This data can be provided by company portal 330 (FIG. 3). The interface can show contact info and a list of reviews. Each review can be clickable and lead to a review screen.

Figure 8J:
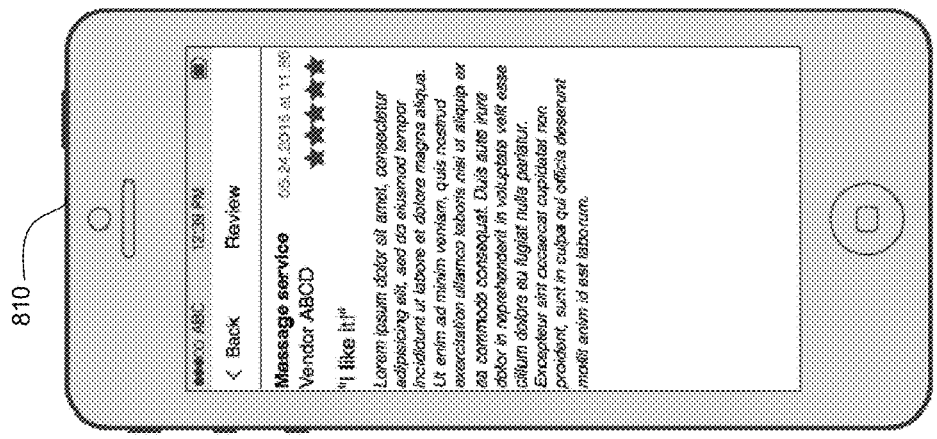
FIGS. 8J-8L each illustrate an exemplary user interface on a mobile device that enables an employee to review a service in accordance with some embodiments.
Figure 8K:
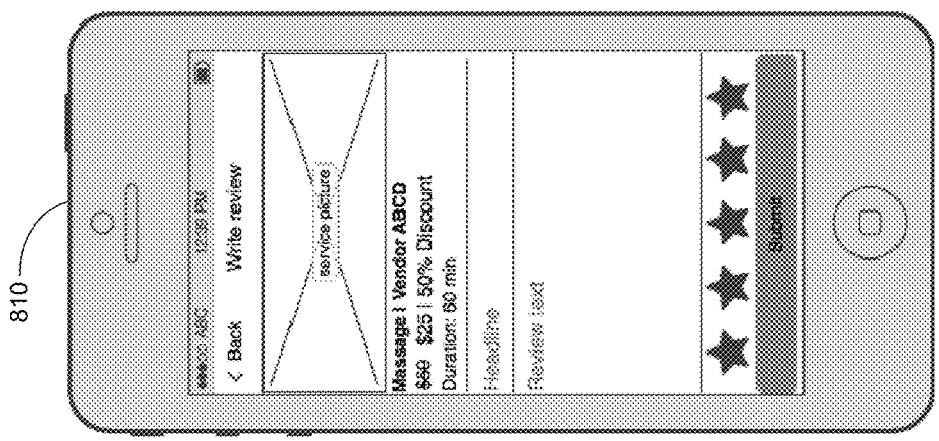
Figure 8L:
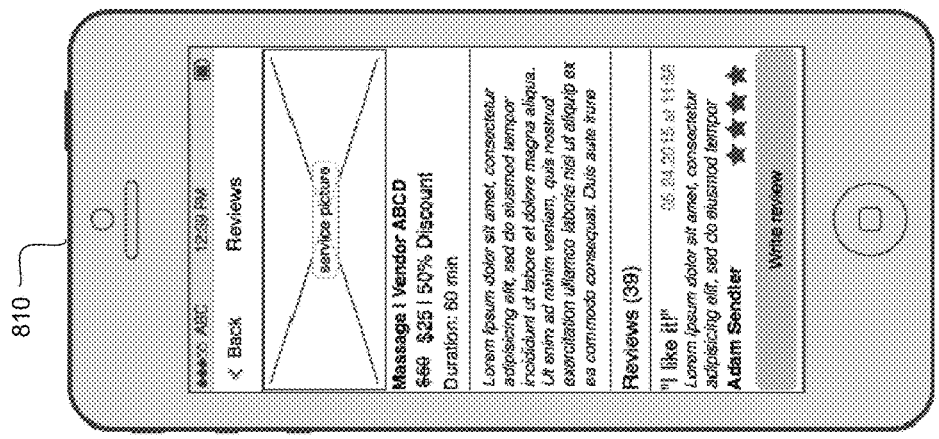

FIGS. 8J-8L each illustrate an exemplary user interface on a mobile device that enables an employee to review a service in accordance with some embodiments. The review screen shows a service's information, such as title, duration, description, icon, old price, price with discount and subsidy percentages. The interview can show how other employees reviewed the service as well. In some embodiments, reviews may be restricted to inside one company. Each review can contains a text description, rating from 1-5 stars, person, date, etc. After a review is finished, the review can go to company portal 330 (FIG. 3) for approval.

Figure 9A:
FIG. 9A illustrates an exemplary user interface on a mobile device that enables an employee to view a vendor's profile information in accordance with some embodiments.

FIG. 9A illustrates an exemplary user interface on a mobile device 810 that enables an employee to view a vendor's profile information in accordance with some embodiments. The vendor screen can show contact information, description, image, and list of services, available for employee.

Figure 9C:
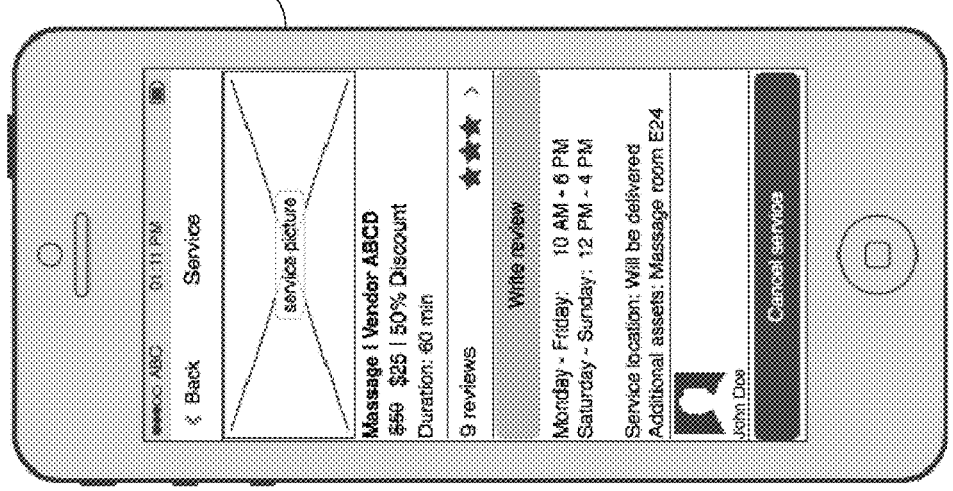
FIGS. 9B-9C each illustrate an exemplary user interface on a mobile device 810 that enables a vendor to manage an order in accordance with some embodiments.
Figure 9B:
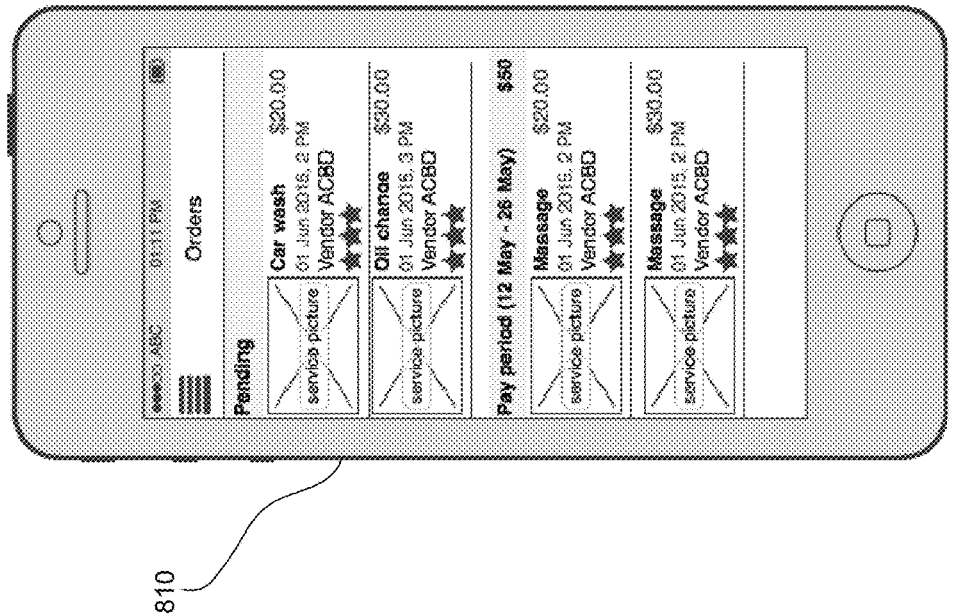

FIGS. 9B-9C each illustrate an exemplary user interface on a mobile device 810 that enables a vendor to manage an order in accordance with some embodiments. The orders screen can show a history and pending services. By tapping on each order, a service details screens may appear with the possibility to cancel selected service.

Figure 9D:
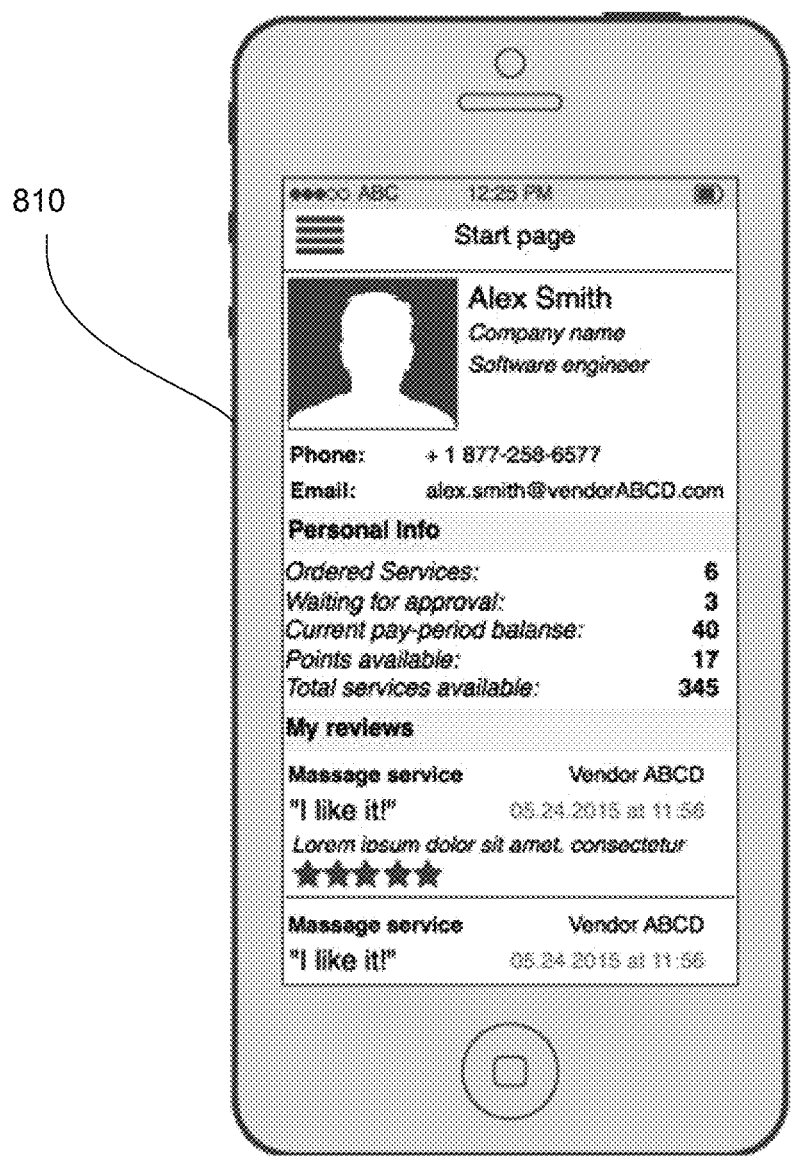
FIG. 9D illustrates an exemplary user interface on a mobile device that enables a vendor to manager profile information in accordance with some embodiments.

FIG. 9D illustrates an exemplary user interface on a mobile device that enables a vendor to manager profile information in accordance with some embodiments. The employee may be presented with an opportunity to edit profile details: password user picture. The page can contain order history and pending orders, information that is public and can be seen by other employees, such as name, position, department, company, phone, email, location, picture, and reviews. Other info may be private and can be accessed by employee or Office manager.

Figure 10A:
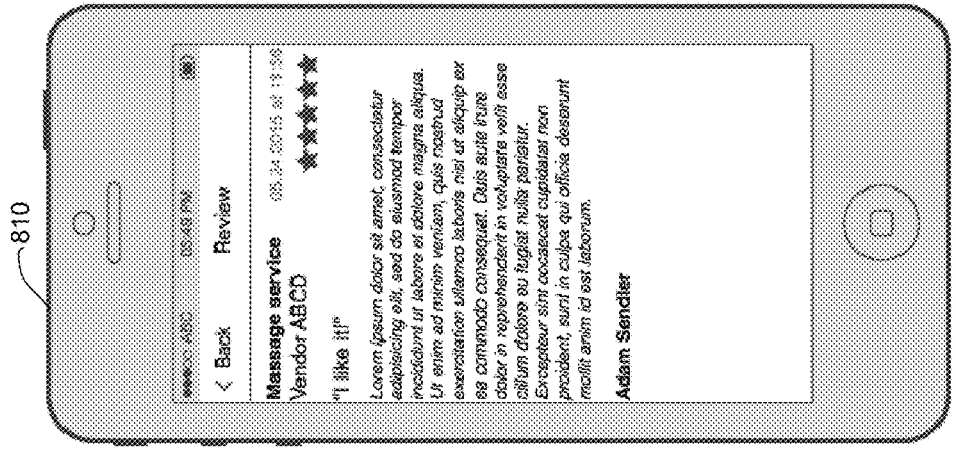
FIGS. 10A-10C each illustrate an exemplary user interface on a mobile device that enables support requests and management in accordance with some embodiments.
Figure 10B:
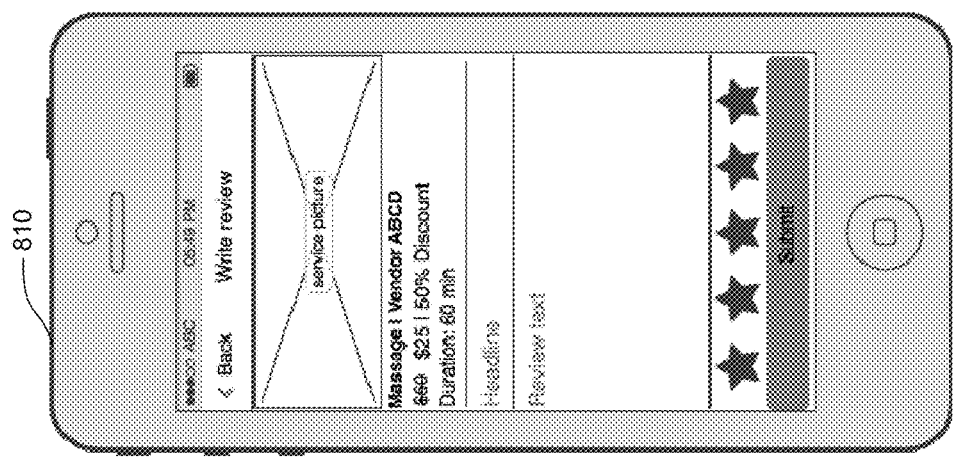
Figure 10C:
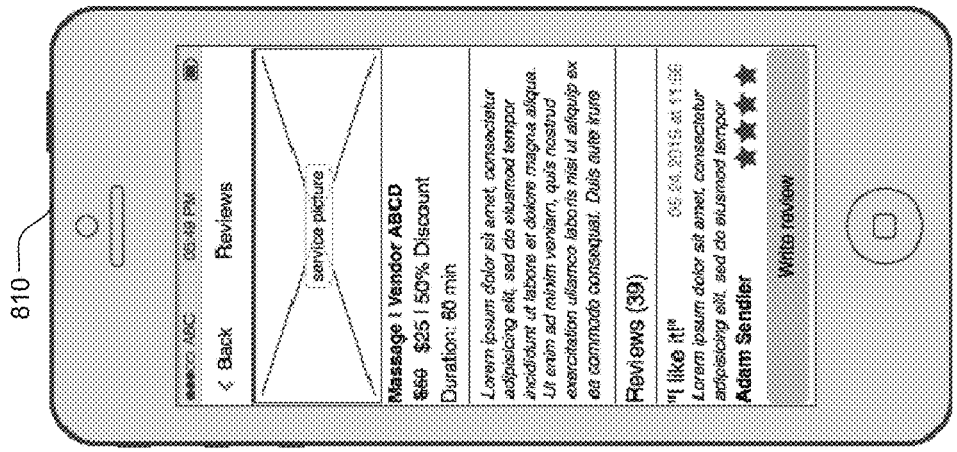

FIGS. 10A-10C each illustrate an exemplary user interface on a mobile device that enables support requests and management in accordance with some embodiments. A user is able to ask for support regarding any question. Some examples of types of requests are, reporting an issue or asking a question. Support issues can be assigned a priority, such as low, normal, high. In some embodiments, after a user submits a request, the request can be forwarded to company portal 430 for further approval.

Users may also be able to view and post reviews of the vendor and/or service offered by the vendor. For example, a user may post a review for a massage offered by vendor ABCD.

Figure 11:
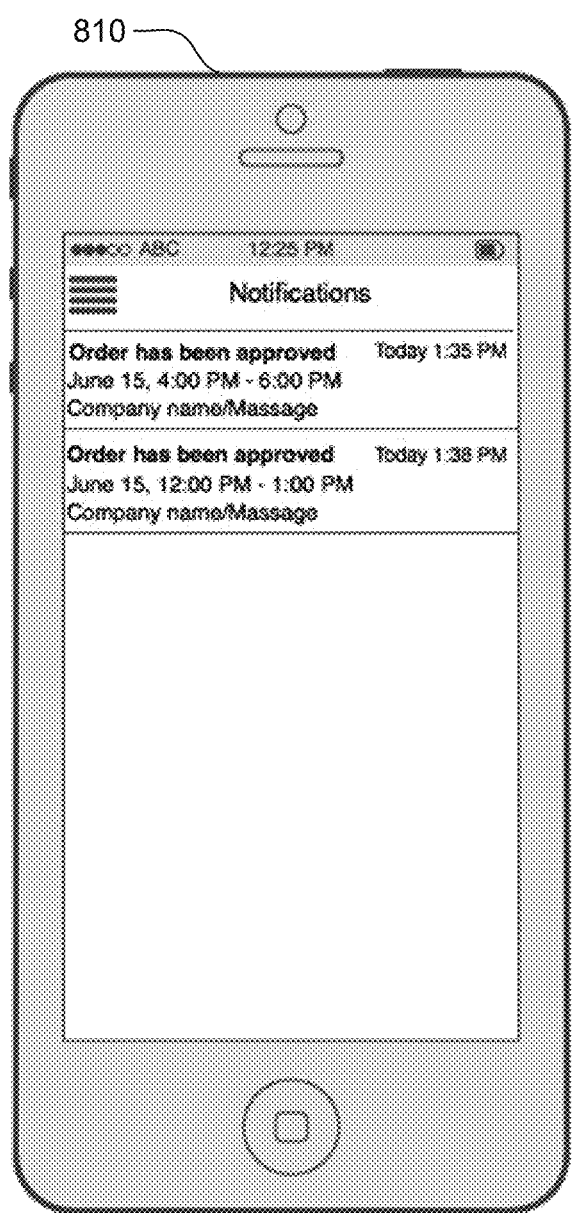
FIG. 11 illustrates an exemplary user interface on a mobile device that enables notification management in accordance with some embodiments.

FIG. 11 illustrates an exemplary user interface on a mobile device 810 that enables notification management in accordance with some embodiments. The notification screen can contain many types of notifications that a user can receive, such as order approval, preparing for a service notification, vendor en route, service completed, etc. Notifications can also be sent via email, SMS, phone call, etc.

In some embodiments, workplace services platform 110 generates a boarding pass displaying a service provider's credentials. On entry, credentials are downloaded to an employer computer, such as a receptionist computer. Verification of the boarding pass can include, for example, a green indicator indicative of allow entry, a yellow indicator indicative of a check with employee/office manager for access, and a red indicator indicative of a deny entry event. The boarding pass can indicate which employee(s) is requesting service, asset location involved in service/map, time allowed on site, and other provisioning.

Figure 12:
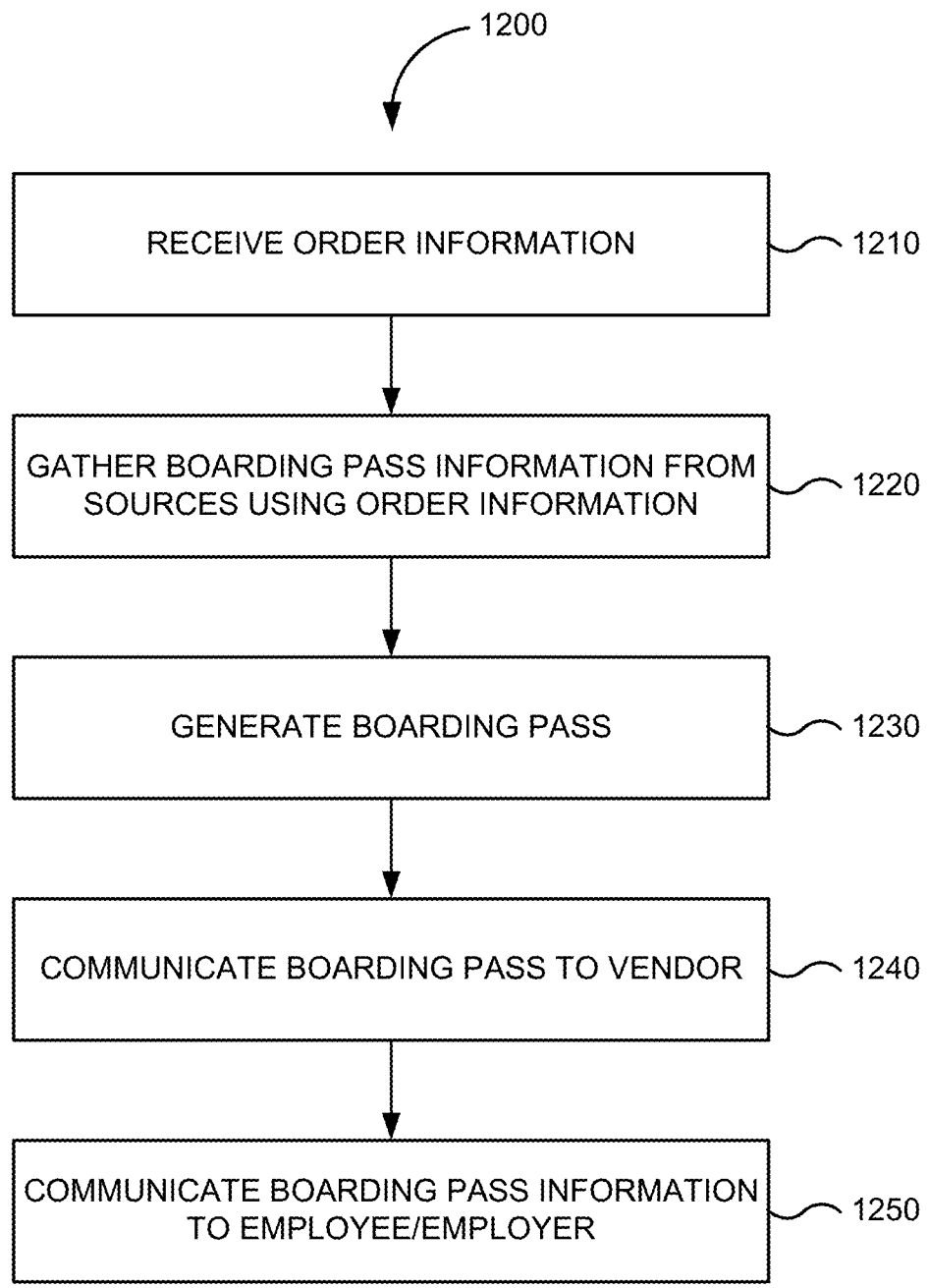
FIG. 12 is a flowchart of method for generating a boarding pass in accordance with some embodiments.

FIG. 12 is a flowchart of method 1200 for generating a boarding pass in accordance with some embodiments. Implementations of or processing in method 1200 depicted in FIG. 12 may be performed by software (e.g., instructions or code modules) when executed by a central processing unit (CPU or processor) of a logic machine, such as a computer system or information processing device, by hardware components of an electronic device or application-specific integrated circuits, or by combinations of software and hardware elements. The method 1200 depicted in FIG. 12 begins at step 1210.

In step 1210, order information is received. The order information can be received from an employee device connected to the workplace services platform 110. The order information can include information describing the employee ordering a good and/or service, a description of the good or service, payment information, or the like. In some embodiments, the information is normalized to remove financial or personal information.

In step 1220, after the order information is received, boarding pass information may be gathered from one or more sources using the received order information. As the received order information may not include all information required to generate a suitable boarding pass, workplace services platform 110 can integrate information from various databases to generate a boarding pass. For example, the order information may be used to determine employee information, employer information, good or service information, vendor information, or the like. The information can be gathered from other sources and combined into the board pass allowing the boarding pass to be utilized as a single source of verification and instruction for all participants.

In step 1230, after the boarding pass information is gathered, a boarding pass is generated. The boarding pass can include human readable information or machine-readable information. The boarding pass can include unencrypted or encrypted information. In some embodiments, the boarding pass identifies the vendor providing the service, the service to be provided, the employee requesting the service, a location approved for the service, etc. The boarding pass may further include one or more restrictions, notifications, warnings, or the like to the vendor, employee, or employer.

In step 1240, after the boarding pass is generated, the boarding pass may be communicated to the vendor. This allows the vendor (or vendor's employee) to utilize the boarding pass to deliver a good or perform a service. In step 1250, after the boarding pass is communicated the vendor, boarding pass information may be communicated to the employee and/or employer. This may allow the employee and/or employer to further verify the vendor when the boarding pass is presented for inspection.

Figure 13:
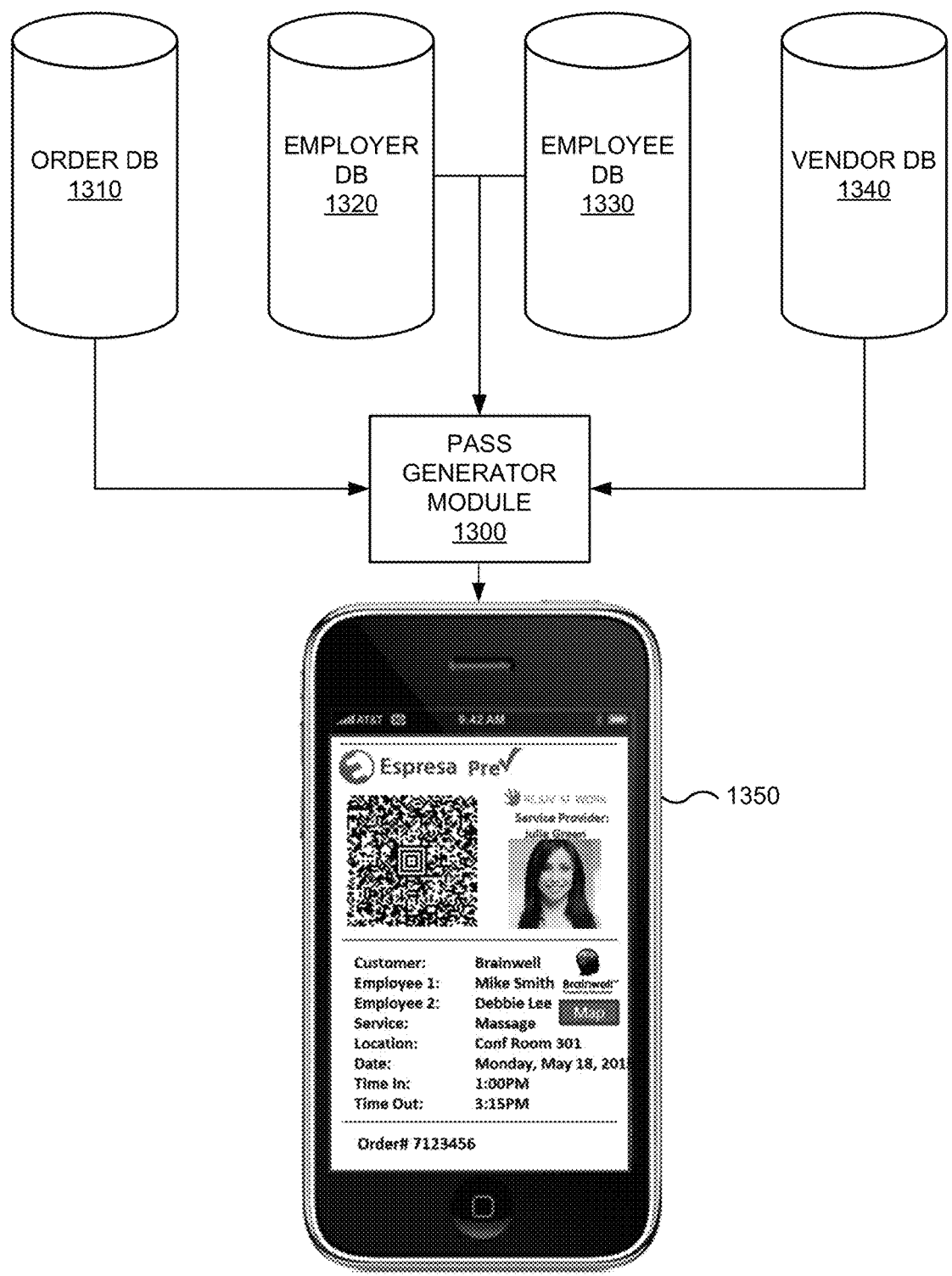
FIG. 13 is a block diagram illustrating how a pass generator module generates a boarding pass according to some embodiments.

FIG. 13 is a block diagram illustrating how a pass generator module 1300 generates a boarding pass according to some embodiments. In this example, pass generator module 1300 may collect information from order database 1310, employer database 1320, employee database 1330, and vendor database 1340 in order to generate pass 1350.

Pass 1350 can include one or more features or elements that identify the vendor, the service, the employer, the employee, or the like. Pass 1350 can be communicated to a mobile device allowing the pass to be utilized by a vendor's designated employee. For example, pass 1350 is a boarding pass for Julie Green from Purple Tie to provide services at LinkedIn for May 18, 2015 between 1:00 PM and 3:15 PM.

In some embodiments, a vendor can receive a map of asset location, such as an employee's desk or office, massage room, cafeteria, etc. The vendor can "self-navigate" to asset location without a greeter/admin/escort. The vendor can be tracked on site by indoor navigation technology, such as Magnetic, Wi-Fi, Bluetooth beacons. The navigation map may be included with or separately from a boarding pass described above.

In some embodiments, a building asset for the purpose of workplace services can be tagged and identified on a map. Some examples of assets are Cafeteria, Dry-cleaning/Laundry closet, Car key box, Massage room, etc. When a vendor enters the building (and after scanning at the front desk) the employee may receive a first notification of service arrival. When a vendor enters the asset area, the employee may receive and additional notification. Vendors may scan the asset or tag to indicate, for example, a laundry pickup, delivery event, food delivery event, car key pickup or return event, massage is waiting, etc.

Embodiments described herein allow for the management and supervision overhead of vendors and service providers obtaining access to premises. Vendors are allowed to enter the building with a "Mobile Boarding Pass" concept. The following examples provide further illustration.

In a first case, a receptionist in the lobby of an employer building may scan a boarding pass and allow a vendor into the building based on a Green/Yellow/Red light displayed on an employer computer or other compatible device.

In a second case, a main lobby and remote floor or building may be equipped with key card access. A vendor may check out from the receptionist of the building a "Guest" key card that may allow the vendor access to the remote location. After the vendor completes the service, the vendor may return the key card to receptionist.

In a third case, no receptionist may be present at the employer location/building. However, the building may be equipped with a "smart lock" type system—that can read barcode, NFC, etc. and grant temporary access provisions. The workplace services platform 110 may message the employee via the app to grant entry to the vendor, or the employee may be notified automatically based on proximity of the asset scan (e.g., at the door).

Figure 14:
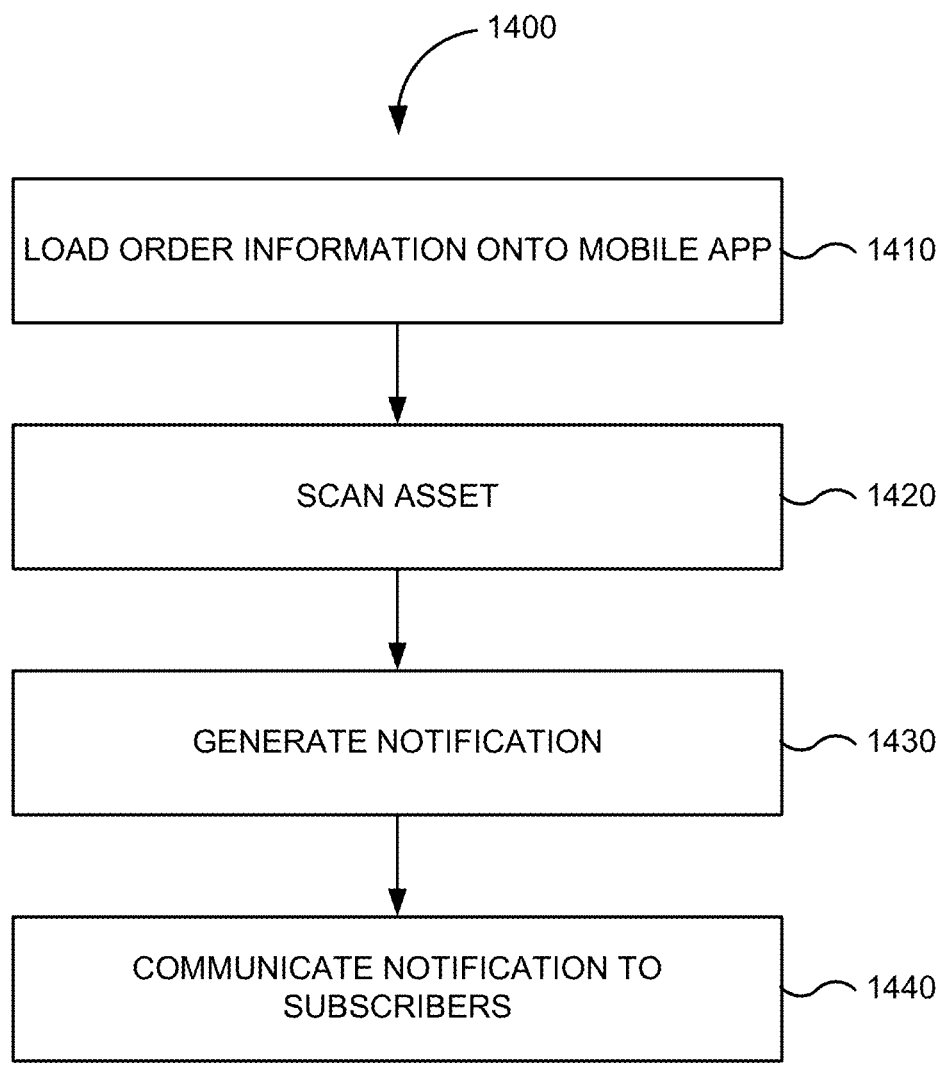
FIG. 14 is a flowchart of method for generating notifications in accordance with one embodiment of the present invention.

FIG. 14 is a flowchart of method 1400 for generating notifications in accordance with one embodiment of the present invention. Implementations of the processing in method 1400 depicted in FIG. 14 may be performed by software (e.g., instructions or code modules) when executed by a central processing unit (CPU or processor) of a logic machine, such as a computer system or information processing device, by hardware components of an electronic device or application-specific integrated circuits, or by combinations of software and hardware elements. Method 1400 depicted in FIG. 14 begins in step 1410.

In step 1410, order information is loaded into a mobile application of a mobile device. The order information can include information describing the employee ordering a good and/or service, a description of the good or service, payment information, or the like. In some embodiments, the information is normalized to remove financial or personal information.

In step 1420, after order information is loaded into the mobile application, an asset is scanned. An asset may be scanned by, for example, a mobile device. For example, a vendor may use his/her mobile device scan an asset.

In step 1430, after an asset is scanned, one or more notifications are generated. The notifications can include textual or graphical notifications.

In step 1440, after the asset is scanned, the one or more notifications are communicated to one or more subscribers. The one or more subscribers may include one or more employees. The notifications may be displayed on a mobile device belonging to, for example, an employee. Upon receiving the notification, the one or more employees may be made aware that the a service is available or completed, or that an asset has been scanned.

In some embodiments, a vendor's available time slots may be visible to an employee. For example, asset available time slots may be visible to the employee, e.g. it takes an available employee, available therapist, and a massage room to schedule a massage. Time slots may be marked as "booked on site" or "booked off site." Special discounts may apply if an employee is going to book a time slot contiguous with an already booked on site time slot, as this may improve travel efficiency for the vendor. Travel time can be factored between on-site and off-site slots. Even more accurate time management can be accomplished by integrating with GPS applications for traffic allotment. Additionally, special discounts can apply if more employees join a group session.

Figure 15:
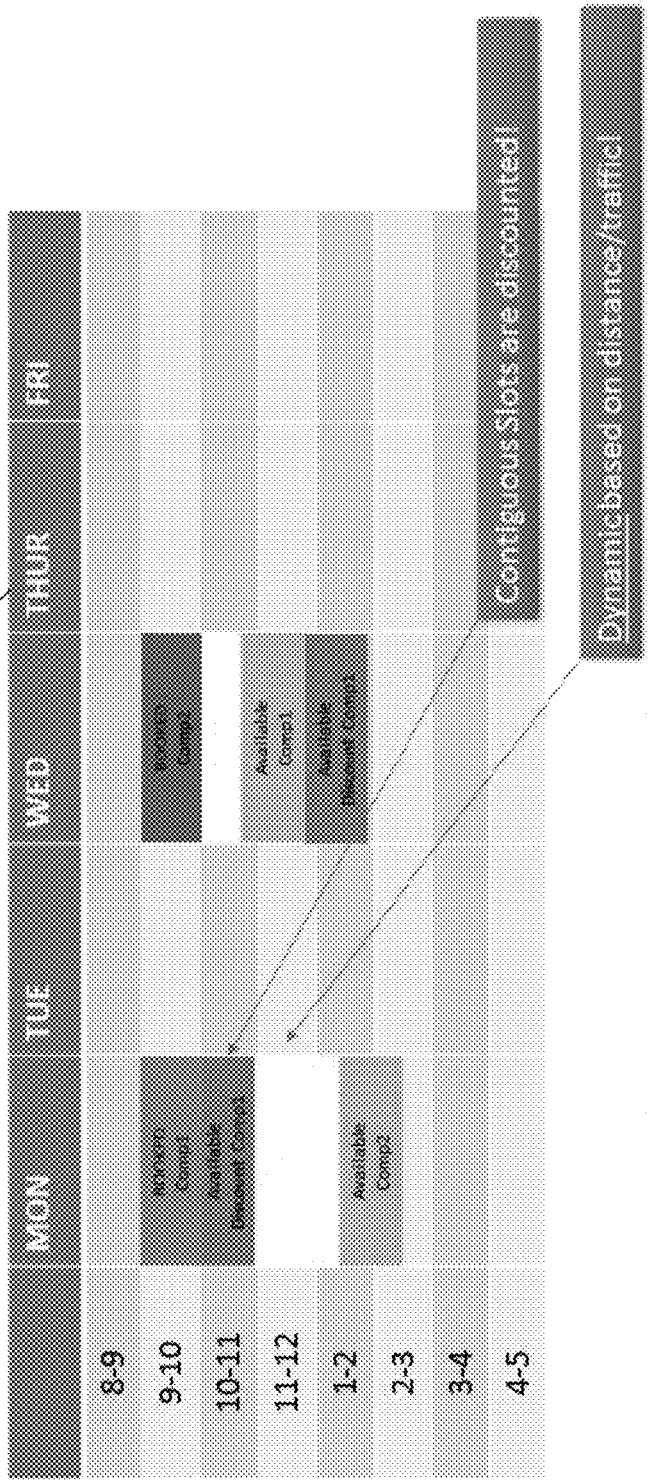
FIG. 15 is a screen shot of dynamically scheduling an event in accordance with some embodiments.

FIG. 15 is a screen shot of dynamically scheduling an event in accordance with some embodiments. An event can be a vendor provided service, for example. A schedule 1510 is shown illustrating days of the week and timeslots where a vendor service can be scheduled. In some embodiments, a flexible cancellation policy and enforcement process may be provided. For example, 24 hours to cancel for full refund, if cancelled less than 24 Hrs, employee (or company) pays, etc. In some embodiments, the cancelled time slot can be auctioned at a discount. For example, 50% if booked within 12 hours, 25% if booked within 6 hours, 10% if booked within 2 hours. The portion paid by the new slot holder may (or may not) be credited to original slot holder (e.g., employee).

A company/employer can decide on a per service bases if there is any subsidy contribution, such as using a points (dollars) system. The company/employer may decide to 100% pay for a massage, but only once per month. The company/employer may decide that food after 7 PM is free. The company/employer may decide that car services are not subsidized. If the employee takes a taxi/Uber to train station after 9 PM it may be free, etc. Full control per service, per event, per time slot, per frequency, limits, etc. may be provided Simple user interface to control subsidy—table format with options. Company can also issue awards to certain employees to be attributed to services. For example, project completion is 100 award (dollars) can be used for services.

In some embodiments, an employee can pay for service with credit card. The employee can request that services will be paid from payroll deduction. Company points and awards may be visible in an employee account (e.g., subsidies) on the workplace services platform. In some embodiments, the company/employer can manage an employee/company allocation of payment.

For example, some services may include on site delivery and pickup. In another example, the workplace services platform may provide for online ordering and scheduling. In another example, the workplace services platform may provide for automated billing. In another example, the workplace services platform may provide for a service where employee laundry can be dropped off using a tagged asset location. In another example, the workplace services platform may provide for secure access to a locker by a bonded/insured service provider. In another example, the workplace services platform may provide for automatically notifying an employee of pickup/delivery of an asset or package.

In another example, the workplace services platform may provide for automated scheduling of a massage by a certified massage provider. In another example, the workplace services platform may provide for secure access to a building (for a vendor) whereby an employee may be notified upon the vendor's arrival.

Figure 16:
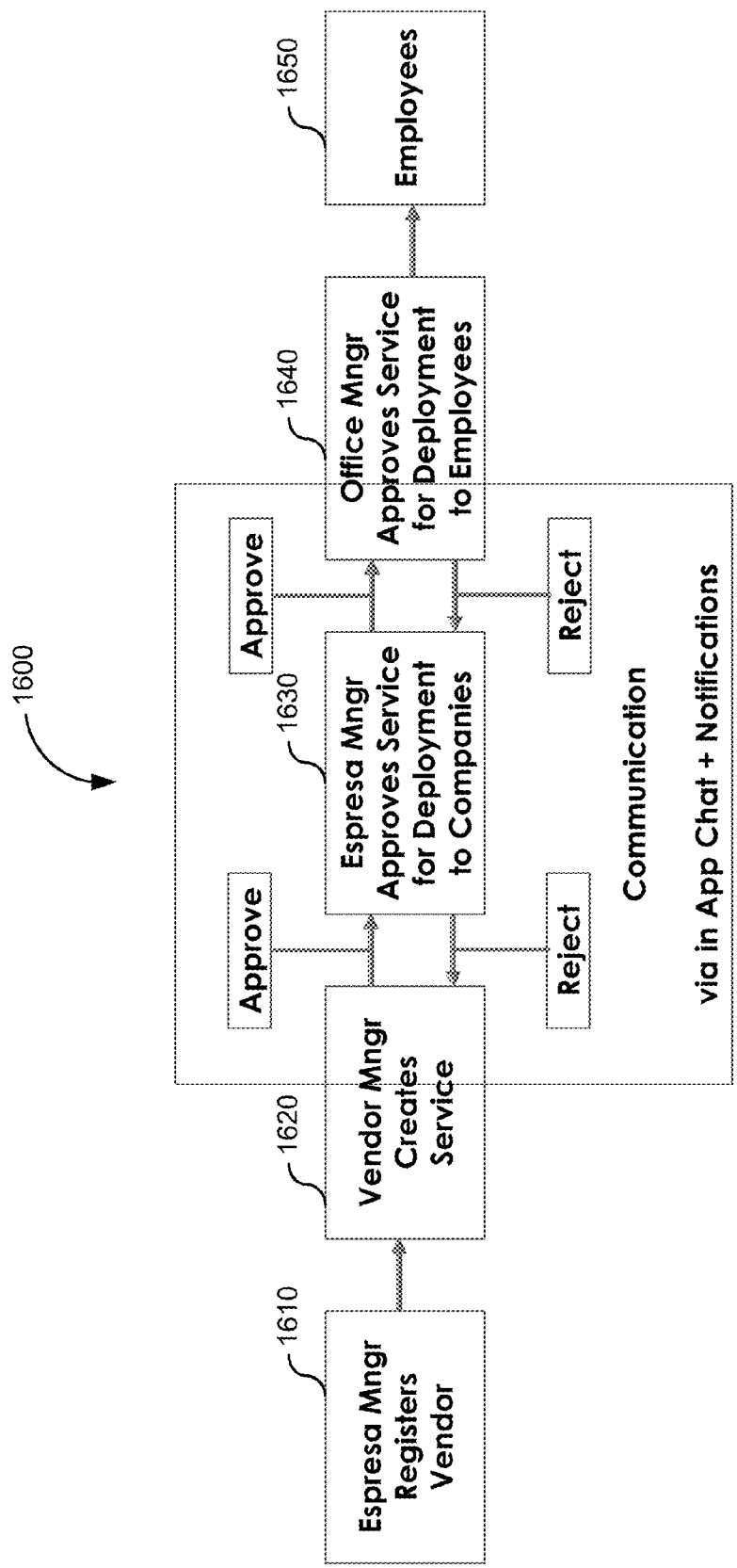
FIG. 16 depicts a simplified diagram of approval workflow in accordance with some embodiments.

FIG. 16 depicts a simplified diagram of approval workflow 1600 in accordance with some embodiments. In this example, in block 1610, a manager of the workplace services platform 110 may register a vendor. In some embodiments, the workplace services platform 110 can allow a vendor to self-register with the platform. This may allow workplace services platform 110 to provide a list of verified vendors to employers using the system. For example, employers no longer have to vet each individual vendor but rather can select from a list of prequalified vendors provided by the workplace services platform 110.

In block 1620, after the vendor is registered, a registered vendor may create one or more services with the workplace services platform 110. For example, the vendor may login to the vendor portal on the workplace services platform 110 and create the one or more services.

In block 1630, after the vendor creates one or more services with the workplace services platform 110, a manager of the workplace services platform 110 may review the services created by the vendor flow for deployment to employers. If a vendor's service is approved, the service can be included in a global catalog of services. If a vendor's service is rejected, the vendor can review the service to determine what criteria with respect to workplace services platform 110 elicited the rejection.

In block 1640, after a manager of the workplace services platform 110 reviews the services, a manager of the employer may now reviews the services created by the vendor flow for deployment to employees. If a vendor's service is approved, the service can be included in a catalog of services offered by the employer to employees in block 1650. If a vendor's service is rejected, the vendor can review the service to determine what criteria with respect to the employer elicited the rejection. As illustrated, communication between participants may occur using in-app chat and notifications during approval workflow 1600.

The embodiments described above may also be useful for a number of employee car/vehicle related services that can be performed at an employer worksite.

In one example, an employee can drop off his/her car keys can be left at the front desk with a key tag and the key storage box will be tagged as an "asset." The employee may then, via the system described above, order car related service such as, but not limited to, a car/vehicle wash, vehicle refuel, oil change, etc. At a time just prior to performing the requested service, the vendor may check in at the front desk of the employer worksite. The vendor may check in with the box asset by scanning his/her mobile device with a device present at the employer worksite and integrated with the workplace services system. Once the vendor checks in with by scanning with the device and picks up the employee's key(s) from the box, this may signify the start of the service. Upon performing and completing the vehicle related service, the vendor may return the employee's key to the box and scan his/her mobile device with the employer located device again, and this may signify that the service has ended. At a later point in time, the bill for the car/vehicle related services rendered may be viewed by the employee via the employee portal or may be sent to the employee's mobile device.

For example, an employee may schedule a car wash of his/her through the employee portal. On the morning of the day of the scheduled car wash, the employee may drop off his/her car keys in the box at the reception desk of the employer's worksite. The key may be scanned in by either the employee himself or the receptionist. The scanned key may be designated as an asset. When the service provider or vendor arrives at the employer worksite, he/she may pick up the key from the box and scan it with his/her mobile device. Alternatively, the receptionist may scan the key pick up action prior to giving the key to the service provider or vendor. The employee may receive a notification that the vendor is on site and the car wash for his/her car is about to begin. Upon completion of the car wash, the vendor or service provider may return the key to the box or hand it to the receptionist. The vendor or service provider (or receptionist) may scan the key prior to returning the key to the box. The employee may receive a notification on his/her mobile device or via the employee portal that the car wash is complete, and at a later point in time may also receive the bill or receipt for the rendered service.

The example above can also be applied to a vehicle refueling service.

The concept above can also be extended to package delivery to an employee's vehicle. Online shopping has become increasingly more popular in recent years. Some people do a majority of their shopping online. Some people elect to have their online purchases delivered to their homes. However, in some cases, delivery to the home is not convenient and/or is risky. For example, a delivery person may not have access behind a closed gate, may require someone present for a signature, or packages left at the door can easily be stolen by thieves. As a result, many people prefer to have their online purchases delivered to their work/office.

When packages are delivered to an individual's work/office, they are typically left in the lobby with the reception or in the mailroom. However, if many employees elect to have their online purchases delivered to their work/office, the packages can easily pile up at the reception desk or mailroom. Further, security and theft issues can also arise due to the vast number of packages. The employer also wastes resources by having to deliver personal packages to employees or calling employees to pick up their packages. Further, after an employee picks up a package, he/she typically has to carry the package to his/her car at some point. Logistically, delivery of packages at the workplace causes many issues for the employer.

One possible solution is to have the delivery person deliver packages intended for the employee directly to the person's car. However, the traditional method of accomplishing this would require that the employee be paged when the delivery person arrives to bring the key to the delivery person and provide the delivery person with the location of the car. The delivery person must then return the key to the employee after delivering the package to the car. Additionally, some concerns arise such as whether the identity of the delivery person is legitimate and whether it is safe to provide the delivery person with the keys.

Figure 17A:
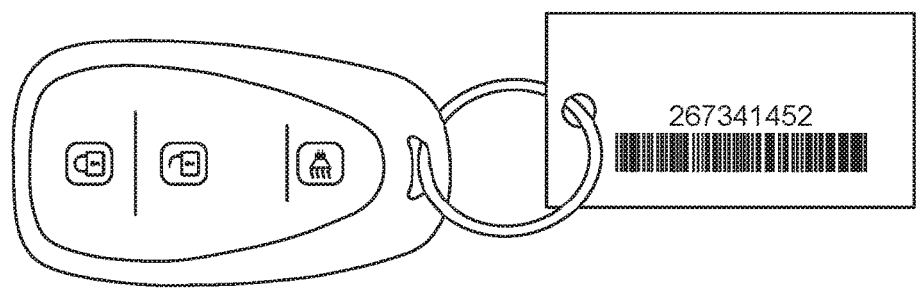
FIGS. 17A-17C depicts a simplified diagram of a distributed system for implementing some embodiments.

As mentioned above, the platform provides car related services for employees where the employee's key is associated with a personal tag related to the platform. For example, in FIG. 17A, a personal tag is associated with an employee's key. The employee can designate the location of their car in the parking lot via the platform. The employee may leave his/her key along with the personal tag at the receptionist or front desk if, for example, the employee is expecting a delivery that day. The employee or receptionist may scan the key upon drop off and the server computer may receive information indicating such.

Figure 17B:
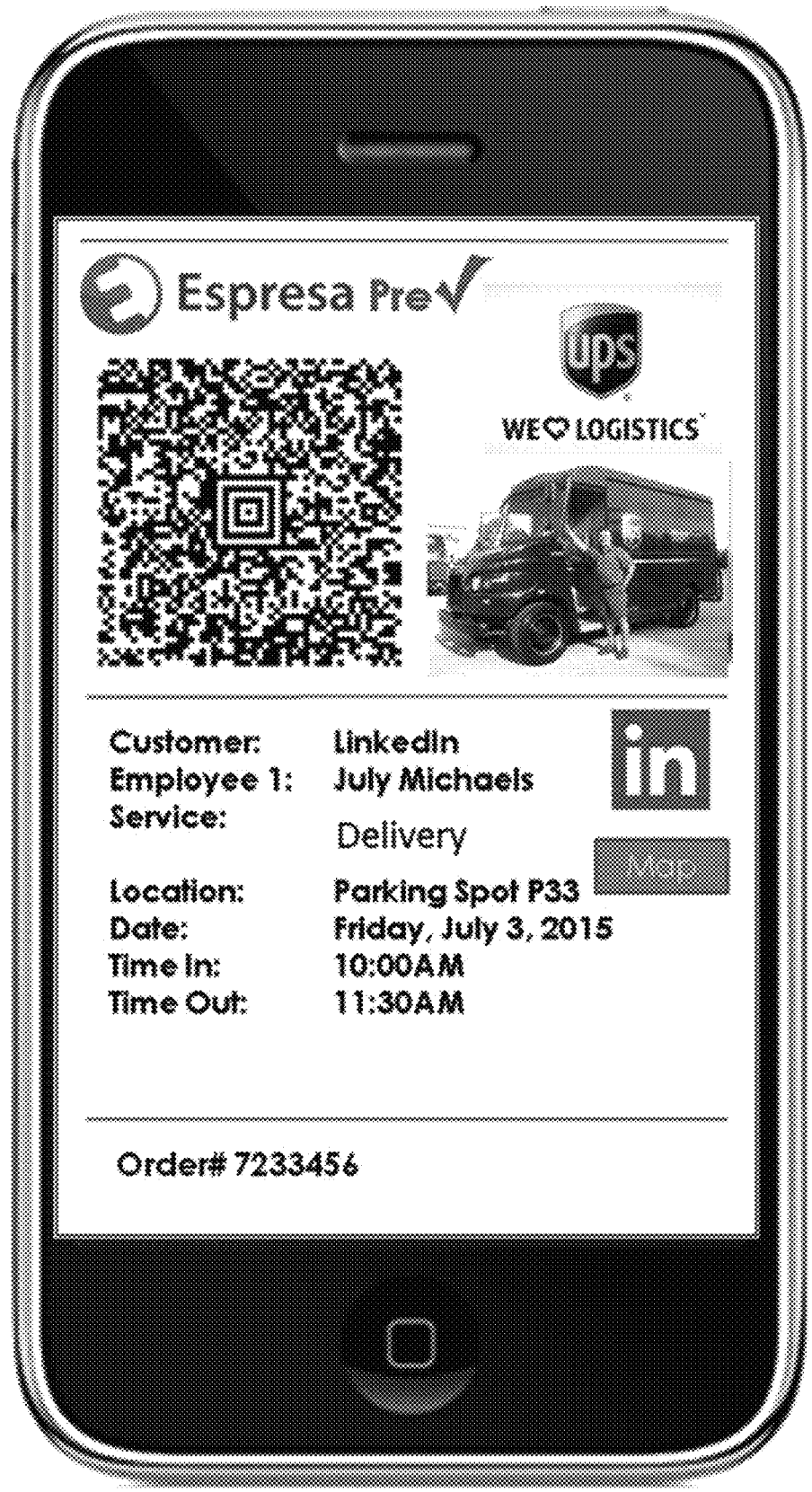
Figure 17C:
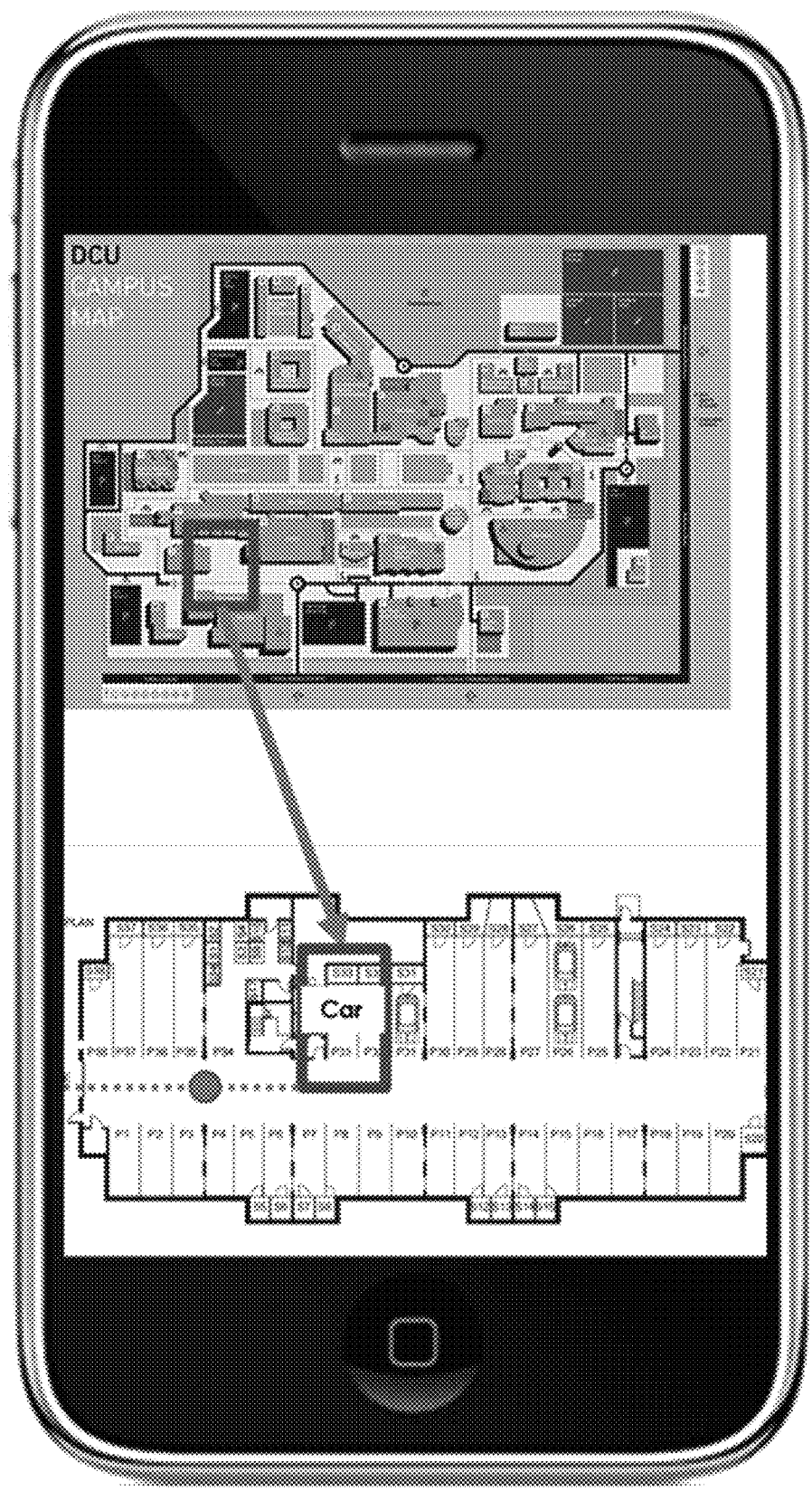

When the delivery person arrives with the employee's package, the delivery person may access an application on his/her mobile device that allows for the personal tag associated with the employee's key to be scanned/read (e.g., a first scanning of the asset/key). Upon scanning the key, the receptionist may be notified that the delivery person is an authorized person with the platform. The notification may take the form of a indicator light, where green represents approved and red represents not approved. The "boarding pass", mentioned above may show the location of the employee's car to the delivery person. For example, the boarding pass in FIG. 17B indicates the employee's name, parking location, date, time in, time out, etc. Further, a map of the employer's campus and precise location of the parking spot may be displayed to the delivery person via the mobile application. For example, FIG. 17C shows a map of the employer's campus and precise location of the employee's parking spot within a mobile application accessible by the delivery person. The delivery person may then deliver the employee's package to the employee's car, use the keys to open the trunk, and place the employee's package in the trunk of the car. The delivery person may then return the keys along with the associated personal tag to the receptionist, and scan the key using the mobile application to indicate to the platform that the package has been delivered and the keys have been return (e.g., a second scanning of the key). At the end of the day, the employee may pick up the key from box at reception and it may be scanned out by either the employee or the receptionist (e.g., third scanning of the key). The platform may receive an indication that the key is now back in the employee's possession.

Figure 18:
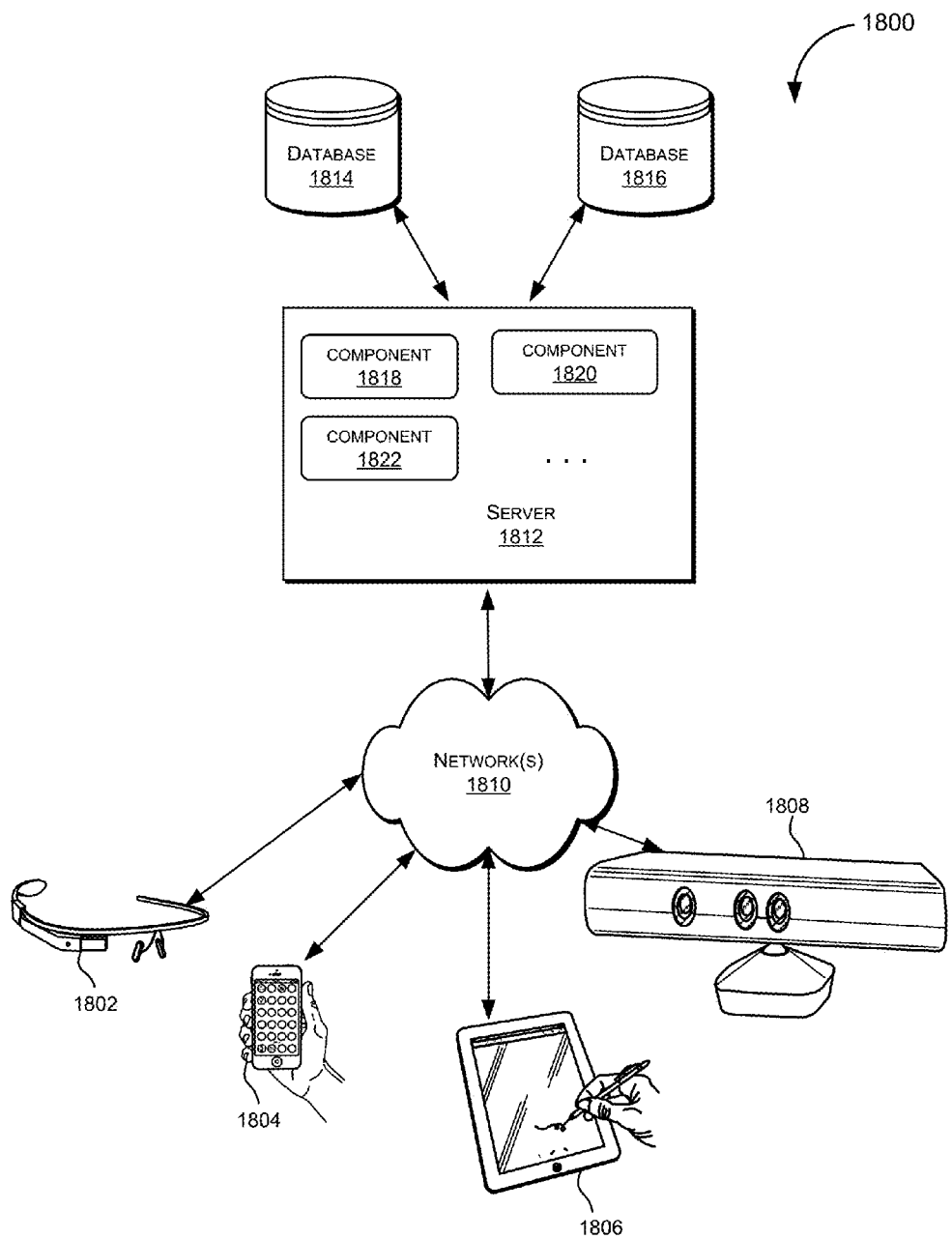
FIG. 18 illustrates an exemplary computer system, in which various embodiments of the present invention may be implemented.

FIG. 18 depicts a simplified diagram of a distributed system 1800 for implementing some embodiments. In the illustrated embodiment, distributed system 1800 includes one or more client computing devices 1802, 1804, 1806, and 1808, which are configured to execute and operate a client application such as a web browser, proprietary client (e.g., Oracle Forms), or the like over one or more network(s) 1810. Server 812 may be communicatively coupled with remote client computing devices 1802, 1804, 1806, and 1808 via network 1810.

In various embodiments, server 1812 may be adapted to run one or more services or software applications provided by one or more of the components of the system. In some embodiments, these services may be offered as web-based or cloud services or under a Software as a Service (SaaS) model to the users of client computing devices 1802, 1804, 1806, and/or 1808. Users operating client computing devices 1802, 1804, 1806, and/or 1808 may in turn utilize one or more client applications to interact with server 1812 to utilize the services provided by these components.

In the configuration depicted in the figure, the software components 1818, 1820 and 1822 of system 1800 are shown as being implemented on server 1812. In other embodiments, one or more of the components of system 1800 and/or the services provided by these components may also be implemented by one or more of the client computing devices 1802, 1804, 1806, and/or 1808. Users operating the client computing devices may then utilize one or more client applications to use the services provided by these components. These components may be implemented in hardware, firmware, software, or combinations thereof. It should be appreciated that various different system configurations are possible, which may be different from distributed system 1800. The embodiment shown in the figure is thus one example of a distributed system for implementing an embodiment system and is not intended to be limiting.

Client computing devices 1802, 1804, 1806, and/or 1808 may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 10, Palm OS, and the like, and being Internet, e-mail, short message service (SMS), Blackberry®, or other communication protocol enabled. The client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices 1802, 1804, 1806, and 1808 may be any other electronic device, such as a thin-client computer, an Internet-enabled gaming system (e.g., a Microsoft Xbox gaming console with or without a Kinect® gesture input device), and/or a personal messaging device, capable of communicating over network(s) 1810.

Although exemplary distributed system 1800 is shown with four client computing devices, any number of client computing devices may be supported. Other devices, such as devices with sensors, etc., may interact with server 1812.

Network(s) 1810 in distributed system 1800 may be any type of network familiar to those skilled in the art that can support data communications using any of a variety of commercially-available protocols, including without limitation TCP/IP (transmission control protocol/Internet protocol), SNA (systems network architecture), IPX (Internet packet exchange), AppleTalk, and the like. Merely by way of example, network(s) 1810 can be a local area network (LAN), such as one based on Ethernet, Token-Ring and/or the like. Network(s) 1810 can be a wide-area network and the Internet. It can include a virtual network, including without limitation a virtual private network (VPN), an intranet, an extranet, a public switched telephone network (PSTN), an infra-red network, a wireless network (e.g., a network operating under any of the Institute of Electrical and Electronics (IEEE) 802.11 suite of protocols, Bluetooth®, and/or any other wireless protocol); and/or any combination of these and/or other networks.

Server 1812 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. In various embodiments, server 1812 may be adapted to run one or more services or software applications described in the foregoing disclosure. For example, server 1812 may correspond to a server for performing processing described above according to an embodiment of the present disclosure.

Server 1812 may run an operating system including any of those discussed above, as well as any commercially available server operating system. Server 1812 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle, Microsoft, Sybase, IBM (International Business Machines), and the like.

In some implementations, server 1812 may include one or more applications to analyze and consolidate data feeds and/or event updates received from users of client computing devices 1802, 1804, 1806, and 1808. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 1812 may also include one or more applications to display the data feeds and/or real-time events via one or more display devices of client computing devices 1802, 1804, 1806, and 1808.

Distributed system 1800 may also include one or more databases 1814 and 1816. Databases 1814 and 1816 may reside in a variety of locations. By way of example, one or more of databases 1814 and 1816 may reside on a non-transitory storage medium local to (and/or resident in) server 1812. Alternatively, databases 1814 and 1816 may be remote from server 1812 and in communication with server 1812 via a network-based or dedicated connection. In one set of embodiments, databases 1814 and 1816 may reside in a storage-area network (SAN). Similarly, any necessary files for performing the functions attributed to server 1812 may be stored locally on server 1812 and/or remotely, as appropriate. In one set of embodiments, databases 1814 and 1816 may include relational databases, such as databases provided by Oracle, that are adapted to store, update, and retrieve data in response to SQL-formatted commands.

Figure 19:
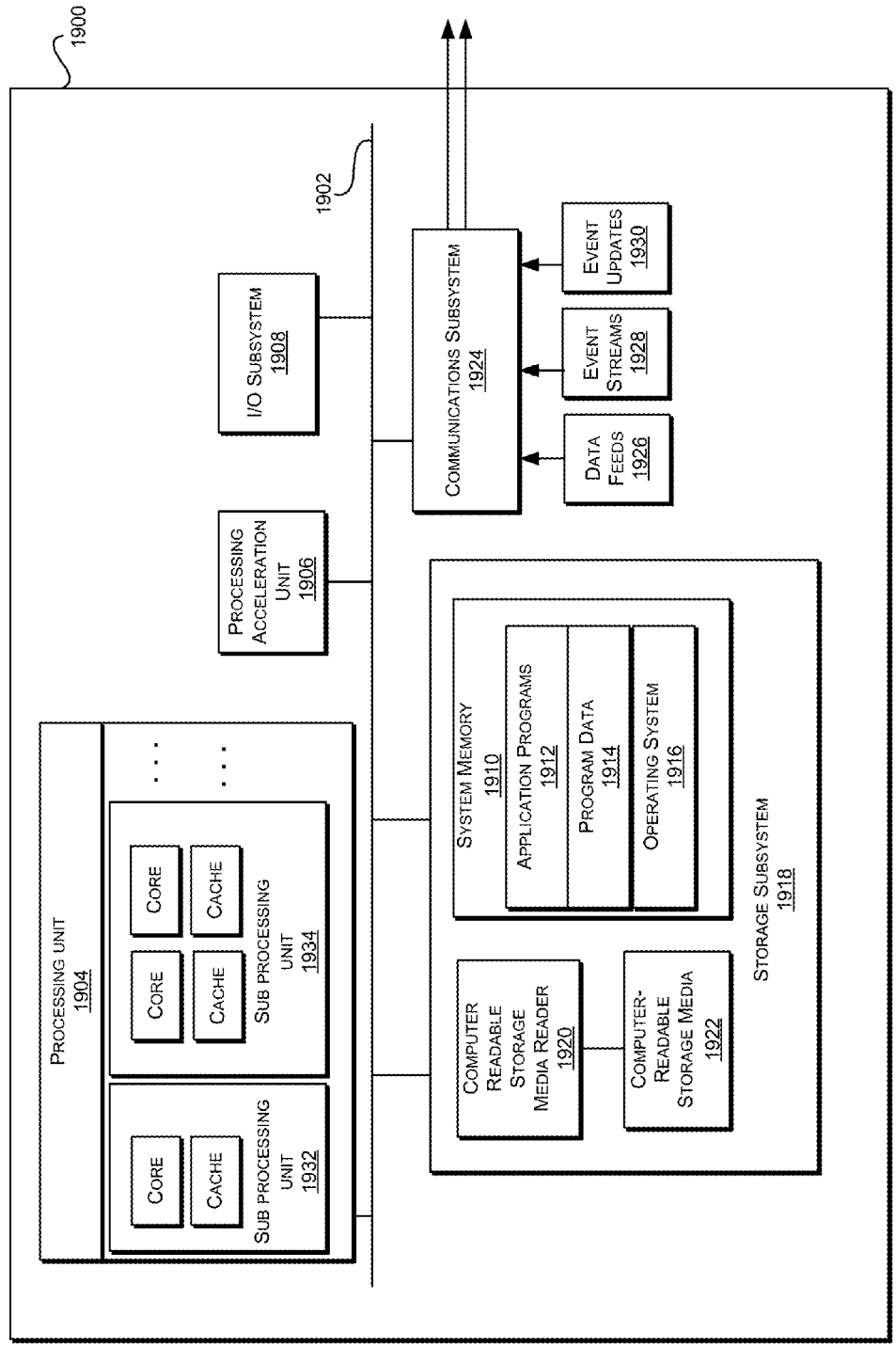
FIG. 19 illustrates an exemplary computer system 1900, in which various embodiments of the present invention may be implemented.

FIG. 19 illustrates an exemplary computer system 1900, in which various embodiments of the present invention may be implemented. The computer system 1900 may be used to implement any of the computer systems described above. As shown in the figure, computer system 1900 includes a processing unit 1904 that communicates with a number of peripheral subsystems via a bus subsystem 1902. These peripheral subsystems may include a processing acceleration unit 1906, an I/O subsystem 1908, a storage subsystem 1918, and a communications subsystem 1924. Storage subsystem 1918 includes tangible computer-readable storage media 1922 and a system memory 1910.

Bus subsystem 1902 provides a mechanism for letting the various components and subsystems of computer system 1900 communicate with each other as intended. Although bus subsystem 1902 is shown schematically as a single bus, alternative embodiments of the bus subsystem may utilize multiple buses. Bus subsystem 1902 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 1904, which can be implemented as one or more integrated circuits (e.g., a conventional microprocessor or microcontroller), controls the operation of computer system 1900. One or more processors may be included in processing unit 1904. These processors may include single core or multicore processors. In certain embodiments, processing unit 1904 may be implemented as one or more independent processing units 1932 and/or 1934 with single or multicore processors included in each processing unit. In other embodiments, processing unit 1904 may also be implemented as a quad-core processing unit formed by integrating two dual-core processors into a single chip.

In various embodiments, processing unit 1904 can execute a variety of programs in response to program code and can maintain multiple concurrently executing programs or processes. At any given time, some or all of the program code to be executed can be resident in processor(s) 1904 and/or in storage subsystem 1918. Through suitable programming, processor(s) 1904 can provide various functionalities described above. Computer system 1900 may additionally include a processing acceleration unit 1906, which can include a digital signal processor (DSP), a special-purpose processor, and/or the like.

I/O subsystem 1908 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 1800 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 1900 may comprise a storage subsystem 1918 that comprises software elements, shown as being currently located within a system memory 1910. System memory 1910 may store program instructions that are loadable and executable on processing unit 1904, as well as data generated during the execution of these programs.

Depending on the configuration and type of computer system 1900, system memory 1910 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 1904. In some implementations, system memory 1910 may include multiple different types of memory, such as static random access memory (SRAM) or dynamic random access memory (DRAM). In some implementations, a basic input/output system (BIOS), containing the basic routines that help to transfer information between elements within computer system 1900, such as during start-up, may typically be stored in the ROM. By way of example, and not limitation, system memory 1910 also illustrates application programs 1912, which may include client applications, Web browsers, mid-tier applications, relational database management systems (RDBMS), etc., program data 1914, and an operating system 1916. By way of example, operating system 1916 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 19 OS, and Palm® OS operating systems.

Storage subsystem 1918 may also provide a tangible computer-readable storage medium for storing the basic programming and data constructs that provide the functionality of some embodiments. Software (programs, code modules, instructions) that when executed by a processor provide the functionality described above may be stored in storage subsystem 1918. These software modules or instructions may be executed by processing unit 1904. Storage subsystem 1918 may also provide a repository for storing data used in accordance with the present invention.

Storage subsystem 1918 may also include a computer-readable storage media reader 1920 that can further be connected to computer-readable storage media 1922. Together and, optionally, in combination with system memory 1910, computer-readable storage media 1922 may comprehensively represent remote, local, fixed, and/or removable storage devices plus storage media for temporarily and/or more permanently containing, storing, transmitting, and retrieving computer-readable information.

Computer-readable storage media 1922 containing code, or portions of code, can also include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computer system 1900.

By way of example, computer-readable storage media 1922 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 1822 may include, but is not limited to, Zip® drives, flash memory cards, universal serial bus (USB) flash drives, secure digital (SD) cards, DVD disks, digital video tape, and the like. Computer-readable storage media 1922 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 1900.

Communications subsystem 1924 provides an interface to other computer systems and networks. Communications subsystem 1924 serves as an interface for receiving data from and transmitting data to other systems from computer system 1900. For example, communications subsystem 1924 may enable computer system 1900 to connect to one or more devices via the Internet. In some embodiments communications subsystem 1924 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 1924 can provide wired network connectivity (e.g., Ethernet) in addition to or instead of a wireless interface.

In some embodiments, communications subsystem 1924 may also receive input communication in the form of structured and/or unstructured data feeds 1926, event streams 1928, event updates 1930, and the like on behalf of one or more users who may use computer system 1900.

By way of example, communications subsystem 1924 may be configured to receive data feeds 1926 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 1924 may also be configured to receive data in the form of continuous data streams, which may include event streams 1928 of real-time events and/or event updates 1930, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 1924 may also be configured to output the structured and/or unstructured data feeds 1926, event streams 1928, event updates 1930, and the like to one or more databases that may be in communication with one or more streaming data source computers coupled to computer system 1900.

Computer system 1900 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Components of computer system 1900 can be used to implement any of the components or modules described herein. For example, computer system 1900 can be used to implement the components or modules of the workplace services portal 310 in FIG. 3.

Due to the ever-changing nature of computers and networks, the description of computer system 1900 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

In the foregoing specification, aspects of the invention are described with reference to specific embodiments thereof, but those skilled in the art will recognize that the invention is not limited thereto. Various features and aspects of the above-described invention may be used individually or jointly. Further, embodiments can be utilized in any number of environments and applications beyond those described herein without departing from the broader spirit and scope of the specification. The specification and drawings are, accordingly, to be regarded as illustrative rather than restrictive.

What is claimed is:

1. A method for managing vendor services provided at an employer service location, comprising:
   receiving, by a server computer, a registration of a vendor based on a first input of the vendor at a vendor portal to the server computer, the first input identifying a vehicle related item or service;
   updating, by the server computer based on the first input, a first database associated with the vendor by identifying in the first database that the vehicle related item or service is offerable;
   presenting, by the server computer based on the first database, registration information about the vehicle related item or service at an employer portal to the server computer;
   receiving, by the server computer, an approval for the vendor based on a second input of an employer at the employer portal, the second input approving to offer the vehicle related item or service to one or more employees and identifying the one or more employees and a permission to access the employer location;
   updating, by the server computer based on the second input, a second database associated with the employer by identifying in the second database the employer location and that the vehicle related item or service is offerable from the vendor to the one or more employees;
   presenting, by the server computer, a schedule of a vendor at an employee portal to the server computer, the schedule identifying timeslots for the vehicle related item or service available from the vendor to the one or more employees;
   receiving, by the server computer, a selection of a timeslot from the schedule, the selection received via the employee portal from an employee device of an employee of the employer;
   scheduling, by the server computer, the timeslot for the vendor to provide the vehicle related item or service;
   gathering, by the server computer from the first database, the second database, and a third database associated with the one or more employees, information that identifies the employee, the vendor, the employer, and the permission to access the employer location;
   generating, by a first scanner device, first data based on a first scan by the first scanner device of an asset attached with a key of a vehicle of the employee;
   receiving, by the server computer, the first data from the first scanner device;
   generating, by the server computer and based on the first data, a first notification about an availability of the key from an employer location of the employer;
   transmitting, by the server computer, the first notification to a vendor device of the vendor;
   generating, by a scanner device, second data based on a second scan of the asset by the scanner device, the scanner device comprising the first scanner device or a second scanner device;
   receiving, by the server computer, the second data from the scanner device;
   generating, by the server computer and based on the second data, a second notification about the vendor receiving the key from the employer location;
   transmitting, by the server computer, the second notification to the employee device;
   generating, by the scanner device, third data based on a third scan of the asset by the scanner device;
   receiving, by the server computer, the third data from the scanner device;
   generating, by the server computer and based on the third data, a third notification about the vendor returning the key to the employer location; and
   transmitting, by the server computer, the third notification to the employee device.

2. The method of claim 1, wherein the vehicle related item or service comprises at least one of a vehicle wash, vehicle refuel, or vehicle repair.

3. The method of claim 1, wherein the vehicle related item or service comprises delivery of a package associated with the employee to the vehicle.

4. The method of claim 1, further comprising transmitting, by the server computer, a map comprising a location of the vehicle to the vendor device in response to the first data.

5. The method of claim 1, further comprising processing, by the server computer, a payment from the employee for the vehicle related item or service and distributing the payment to the vendor.

6. The method of claim 5, further comprising:
   determining one or more subsidies applicable to the vehicle related item or service; and
   prior to processing the payment from the employee, applying the one or more determined subsidies to the vehicle related item or service.

7. The method of claim 1, wherein the asset is associated with a personal tag registered with the server computer.

8. The method of claim 7, wherein the personal tag is associated with the employee.

9. The method of claim 7, wherein the personal tag comprises a quick response (QR) code.

10. The method of claim 1, further comprising receiving, at the server computer, information indicative of the employee taking possession of the asset based at least in part on a fourth scanning of the asset.

11. A system for managing vendor services provided at a workplace, comprising:
   an asset attached with a key of a vehicle of an employee of an employer;
   one or more scanner devices; and a server computer comprising a processor; and a computer readable medium coupled the processor, the computer readable medium comprising code, executable by the processor, for implementing a method comprising:

receiving, by a server computer, a registration of a vendor based on a first input of the vendor at a vendor portal to the server computer, the first input identifying a vehicle related item or service;

updating, by the server computer based on the first input, a first database associated with the vendor by identifying in the first database that the vehicle related item or service is offerable;

presenting, by the server computer based on the first database, registration information about the vehicle related item or service at an employer portal to the server computer;

receiving, by the server computer, an approval for the vendor based on a second input of an employer at the employer portal, the second input approving to offer the vehicle related item or service to one or more employees and identifying the one or more employees and a permission to access the employer location;

updating, by the server computer based on the second input, a second database associated with the employer by identifying in the second database the employer location and that the vehicle related item or service is offerable from the vendor to the one or more employees;

presenting a schedule of a vendor at an employee portal to the server computer, the schedule identifying timeslots for a vehicle related item or service available from the vendor to employees of the employer;

receiving a selection of a timeslot from the schedule, the selection received via the employee portal from an employee device of the employee;

scheduling the timeslot for the vendor to provide the vehicle related item or service;

gathering, by the server computer from the first database, the second database, and a third database associated with the one or more employees, information that identifies the employee, the vendor, the employer, and the permission to access the employer location;

receiving first data from a first scanner device of the one or more scanner devices, wherein the first data is generated by the first scanner device based on a first scan of the asset by the first scanner device;

generating, based on the first data, a first notification about an availability of the key from an employer location of the employer;

transmitting the first notification to a vendor device of the vendor;

receiving second data from a scanner device of the one or more scanner devices, the second data generated by the scanner device based on a second scan of the asset by the scanner device, the scanner device comprising the first scanner device or a second scanner device;

generating, based on the second data, a second notification about the vendor receiving the key from the employer location;

transmitting the second notification to the employee device; receiving third data from the scanner device, the third data generated by the scanner device based on a third scan of the asset by the scanner device;

generating, based on the third data, a third notification about the vendor returning the key to the employer location; and transmitting the third notification to the employee.

12. The system of claim 11, wherein the vehicle related item or service comprises at least one of a vehicle wash, vehicle refuel, or vehicle repair.

13. The system of claim 11, wherein the vehicle related item or service comprises delivery of a package associated with the employee to the vehicle.

14. The system of claim 11, wherein the method further comprises transmitting, by the server computer, a map comprising a location of the vehicle to the vendor device in response to the first data.

15. The system of claim 11, wherein the method further comprises processing, by the server computer, a payment from the employee for the vehicle related item or service and distributing the payment to the vendor.

16. The system of claim 15, wherein the method further comprises:

determining one or more subsidies applicable to the vehicle related item or service; and prior to processing the payment from the employee, applying the one or more determined subsidies to the vehicle related item or service.

17. The system of claim 11, wherein the asset is associated with a personal tag registered with the server computer.

18. The method of claim 1, further comprising:

presenting, by the server computer based on the second database, an offer about the stern or the service at the employee portal to the server computer; receiving, by the server computer from the employee device, an order for the item or service based on a third input of the employee at the employee portal; and updating, by the server computer, a third database based on the third input by identifying in the third database the order and the employee.

19. The method of claim 18, further comprising:

generating, by the server computer, user interface (UD data based on the information, the UI data comprising a credential associated with access of the vendor to the employer location based on the permission, the UI data identifying the employer and employee; and transmitting, by the server computer, the UI data to the vendor device wherein a presentation of the UI data by the vendor device enables an authentication of the vendor to receive the key from the employer location based on the credential.

20. The method of claim 1, wherein the first scanner device comprises the employee device or an employer device of the employer, and wherein the scanner device comprises the employer device or the vendor device.

* * * * *